(12) United States Patent
Ben Jemâa

(10) Patent No.: US 9,800,644 B2
(45) Date of Patent: Oct. 24, 2017

(54) SERVICE ORIENTED QUERY AND SERVICE QUERY LANGUAGE FRAMEWORK

(71) Applicant: Software AG, Darmstadt (DE)

(72) Inventor: Jameleddine Ben Jemâa, Hamburg (DE)

(73) Assignee: Software AG, Darmstadt (DE)

(*) Notice: Subject to any disclaimer, the term of this patent is extended or adjusted under 35 U.S.C. 154(b) by 536 days.

(21) Appl. No.: 14/455,231

(22) Filed: Aug. 8, 2014

(65) Prior Publication Data
US 2016/0042068 A1    Feb. 11, 2016

(51) Int. Cl.
G06F 17/30    (2006.01)
H04L 29/08    (2006.01)

(52) U.S. Cl.
CPC ........ H04L 67/02 (2013.01); G06F 17/30876 (2013.01)

(58) Field of Classification Search
USPC .................................................. 707/792–794
See application file for complete search history.

(56) References Cited

U.S. PATENT DOCUMENTS

| | | | | |
|---|---|---|---|---|
| 7,730,094 B2* | 6/2010 | Kaler | ................. | G06F 21/6218 707/785 |
| 7,983,971 B1* | 7/2011 | McLuckie | .............. | G06Q 40/00 705/30 |
| 8,677,377 B2* | 3/2014 | Cheyer | ................. | G09B 21/00 719/310 |
| 8,762,215 B2 | 6/2014 | Barros et al. | | |
| 8,775,462 B2 | 7/2014 | Coldicott et al. | | |
| 9,389,922 B2* | 7/2016 | Bauer | .................. | G06F 9/5061 |
| 2003/0004746 A1* | 1/2003 | Kheirolomoom | ...... | G06Q 10/10 717/104 |
| 2005/0262189 A1* | 11/2005 | Mamou | .................. | G06Q 10/10 709/203 |
| 2006/0206883 A1* | 9/2006 | Sabbouh | .......... | G06F 17/30893 717/146 |

(Continued)

OTHER PUBLICATIONS

Stuber, Eva, "From Multi-Channel to Cross-Channel—A challenge for trade". @Strategy Das kostenlose Web-Magazin. Oct. 27, 2011.

(Continued)

*Primary Examiner* — Hanh Thai
(74) *Attorney, Agent, or Firm* — Posz Law Group, PLC

(57) ABSTRACT

A method, system and/or non-transitory computer readable medium is used with a service repository that stores service definitions for services. A query facility inspects service definitions in the service repository. The query facility determines, from the inspection, first attributes associated with a first service and different second attributes associated with a second service, the first and second attributes being related to syntactic and semantic aspects of the first and second services. Responsive to a service oriented request which indicates the first service, the query facility determines a composability of the first and second services in accordance with a service oriented query (SOQ) framework, based on the first and second attributes and rules regarding composability of attributes, the rules being in accordance with the SOQ framework, the composability of the first and second services being determined with respect to both the syntactic and semantic aspects of the first and second services.

21 Claims, 20 Drawing Sheets

(56) References Cited

U.S. PATENT DOCUMENTS

| | | | | |
|---|---|---|---|---|
| 2008/0168420 | A1* | 7/2008 | Sabbouh | G06F 17/30893 717/104 |
| 2009/0222429 | A1* | 9/2009 | Aizenbud-Reshef | G06F 8/36 |
| 2010/0030890 | A1* | 2/2010 | Dutta | G06Q 10/06 709/224 |
| 2011/0119651 | A1* | 5/2011 | Utschig-Utschig | G06F 8/35 717/107 |
| 2012/0016678 | A1* | 1/2012 | Gruber | G06F 17/3087 704/275 |
| 2015/0160988 | A1* | 6/2015 | Scomparim | G06F 7/00 719/318 |

OTHER PUBLICATIONS

Mehic, Emina, "Commerce versus stationärer Handel am Beispiel der Textilbranche". Institut für Informationswirtschaft an der Wirtschaftsuniversität Wien. 2007. (English abstract only).

Tsalgatidou, Aphrodite et al., "Specification of the Unified Service Query Language (USQL)". Dept. of Informatics & Telecom. University of Athens. 2006.

Pantazoglou, Michael et al., "The Unified Service Query Language Technical Report". National and Kapodistrian University of Athens, Hellas. Jul. 19, 2009.

Papazoglou, Michael et al., "Service-Oriented Computing: A research Roadmap". International Journal of Cooperative In-formation Systems vol. 17, No. 2, pp. 223-255. World Scientific Publishing Company. 2008.

Cremene, Marcel et al., "Service Composition Based on Natural Language Requests". 2009.

Gunther, Sebastian, "Service-Oriented Architecture: Intro-ducing a Query Language". Multikonferenz Wirtschaftsinformatik 2008.

Petropoulos, Michalis et al., "Clide: Interactive Query Formulation for Service Oriented Architectures". SIGMOD'07, Beijing, China, Jun. 11-14, 2007.

Gripay, Yann et al.,"Towards service oriented continuous queries in pervasive systems". RSTI-ISI-13/2008. Modèles et languages pour les bases de données. 2008.

Barros, Alistair et al. "Handbook of Service Description: USDL and Its Methods". Springer Publishing Company, Incorporated. 2012. (Abstract only).

Oberle, Daniel et al. "A unified description language for human to automated services". Information Systems vol. 38, Issue 1, pp. 155-181. Mar. 2013. (Abstract only).

\* cited by examiner

SERVICE ORCHESTRATION

SERVICE ORCHESTRATION SCENARIO

SERVICE CHOREOGRAPHY

SERVICE CHOREOGRAPHY

| Browser | | | | | | |
|---|---|---|---|---|---|---|
| http://www.softwareag.com/serquel | | | | | | |

Service | Life cycle management | Governance | Taxonomy | Ontology | SOQ Wizard | Xquery Wizard

Security/Policies

| | | | | |
|---|---|---|---|---|
| User | admin | | Groups: | Management Group  V |
| Password | ........... | | Roles: | Service Manager  V |
| Extended Rights | O Active | ● Inactive  Services | | Soap Services  V |
| Remote Access | O Active | ● Inactive  Notifications | | Service Deployment  V |
| | | | Subscriptions: | Service Crash  V |
| SSO: | ● Enabled | O Disabled | | |
| LDAP: | O Enabled | ● Disabled  Network | | |

Services
  wsdl
    Price Request Service  $
    Billing Request
V  Collapse Arrow
    Closed Folder
    Open Folder
>  Expand Arrow
V  Collapse
    + Expand

Stakeholder Management

| Stakeholder  V | Name |
|---|---|
| Provider | SAG |
| Intermediaries | |
| Hoster | SAG |
| Gateway | SAG |
| Aggregator | IDS |
| Broker | IDS |
| Consumer | + Frauenhofer |

SLA/Qos Management

| | | | |
|---|---|---|---|
| Audit log: | Service Usage  V | Action: | Info Login  V |
| Performance: | Bottle Neck  V | Action: | Diagnose  V |
| Availability: | Service Crash  V | Action: | Escalation Mode  V |
| Security: | Violation  V | Action: | Alert  V |
| Response Time: | Degradation  V | Action: | Analyze  V |
| Faults: | Warning  V | Action: | Info Login  V |

| Edit... | Profile | Re/Check | Update | Re/Deploy | Contact | History | Import | Export |

FIG. 12

FORMULA 1: SYNTACTICAL AND SEMANTICAL IMPLICATION $\forall\ Services\ s_1, s_2:$ $isSemanticComposable(s_1, s_2) \Rightarrow isSyntacticComposable(s_1, s_2)$ $\wedge$ $isSyntacticComposable(s_1, s_2) \not\Rightarrow isSemanticComposable(s_1, s_2)$

FIG. 13

FORMULA 2: SOQ FORMAL DEFINITION $SOQ \stackrel{\text{def}}{=} (S, L, G, P, T, O, Q),\quad where$

*S: a finite set of services*

*L: a life cycle management function*

*G: a finite set of governance constraints and policy rules*

*P: a propagation function*

*T: a service taxonomy*

*O: a service ontology*

*Q: a query language, i.e., a finite set of parameterized queries for services and its components*

FIG. 14

FORMULA 3: FORMAL RECURSIVE SERVICE DEFINITION $\emptyset \stackrel{def}{=} (\emptyset, \emptyset, \emptyset)$, *the trivial empty service*

$S_{Atomc} \stackrel{def}{=} (D, SC, \emptyset)$, *an elementary service without composites*

$S \stackrel{def}{=} (D, SC, AS)$, *where*

*D: a finite set of formatted statements for service description*

*SC: a finite set of schemes for format, structure and type definition used for the service*

*AS: a finite set of all associated service composites*

FIG. 15

FORMULA 4: FORMAL LIFE CYCLE DEFINITION $$L: (S, St, V_R) \xrightarrow{def} (S, St, V_R)$$

$$(s_x, state_x, version_x) \xrightarrow{def} L(s_x, state_x, version_x) := (s_y, state_y, version_y), \quad \text{where}$$

- $L$: the life cycle management function
- $S$: a finite set of services
- $St$: a finite set of states
- $V_R$: a finite set of version according to prescribed rule $R$
- $\forall s_x, s_y \in S, version_x, version_y \in V_R$
    - $\nexists s_z \in S, \exists state_z \in St, \exists version_z \in V_R: L(s_z, state_z, version_z) =$
      $(s_y, creation, version_y) \Leftrightarrow L(s_0, state_0, 0) = (s_y, creation, version_y)$
    - $L(s_x, change, version_x) = (s_y, test \mid deprecate \mid delete, version_y)$
    - $L(s_x, test, version_x) = (s_y, change \mid production \mid deprecate \mid delete, version_y)$
    - $L(s_x, production, version_x) = (s_y, change \mid test \mid deprecate \mid delete, version_y)$
    - $L(s_x, deprecate, version_x) = (s_y, change \mid test \mid delete, version_y)$
    - $\nexists s_z \in S, \exists state_z \in St, \exists version_z \in V_R: L(s_x, Delete, version_x)$
      $= (s_z, state_z, version_z) \Leftrightarrow L(s_x, Delete, version_x) = (s_0, state_0, 0)$

FIG. 16
FORMULA 5: FORMAL GOVERNANCE DEFINITION $$G \stackrel{def}{=} (S, A, AM, W), \quad \text{where}$$

- $S$: a finite set of services

- $A$: a finite set of agents defined as: $A \stackrel{def}{=} U \cup UG \cup R$; where
  - $U$: a finite set of users
  - $UG$: a finite set of user groups
  - $R$: a finite set of administrativ and organizational roles

- $AM$: an access matrix for services, users, groups and roles defined as:

$$AM \stackrel{def}{=} (S, A, P, Prio); \text{ where}$$

- $P$: a finite set of generic privileges defined as: $P \stackrel{def}{=} \{(read, \neg read), (write, \neg write), (execute, \neg execute)\}$

- $Prio$: a parametric rule combining privileges arbitrary assigned to users belonging to some groups and attributed some rules additiv or subructiv such as:

$$AM: (S, A) \stackrel{def}{\rightarrow} P,$$

$$(s_x, a_x) \stackrel{def}{\rightarrow} AM(s_x, a_x) := (r_y, w_y, e_y)$$

- $W$: a workflow defined through a quadrupel relationship as $$W \stackrel{def}{=} (E, AT, LR, LE); \text{ where}$$

- $E$: a finite set of events and $P(E)$ its potency
  - $AT$: a finite set of event invoking actions
  - $LR$: a finite set of rules binding events with the boolean operators $\vee, \wedge$ and $\oplus$
  - $LE$: a binary logical expression applying the rules on events as follows:

$$LE: (P(E), LR) \stackrel{def}{\rightarrow} \mathbb{B}, (es_x \subseteq E, r_x) \stackrel{def}{\rightarrow} Le(es_x, r_x) \in \{true, false\}$$

- $W: LE \stackrel{def}{\rightarrow} AT, \; le_x \stackrel{def}{\rightarrow} W(le_x) := a_y$

FIG. 17

FORMULA 6: FORMAL PROPAGATION DEFINITIONS $$\mathbb{P} \stackrel{\text{def}}{=} (S, L, G, Al, Ag), \quad \text{where}$$

- $S$: a finite set of services
- $L$: a life cycle management function
- $G$: a finite set of governance constraints and policy rules
- $Al$: a composition life cycle aggregator defined for an arbitrary composed service $s \in S$ and $S \ni s_{i \in N}$ its members such as $s = ancestor(s_i)$:

$$Al: (S, St, V_R) \xrightarrow{\text{def}} (S, St, V_R), (s_x, state_x, version_x) \xrightarrow{\text{def}} Al(s_x, state_x, version_x)$$

$$:= \bigcap_{i=1}^{n} L(s_i, state_i, version_i), \text{where:}$$

- $Delete \cap st = Delete, \forall st \in St; Delete$ is an absorbing state
- $Create \cap st = Create, \forall st \in St \setminus \{Delete\}$
- $Change \cap st = Change, \forall st \in St \setminus \{Delete, Create\}$
- $Test \cap st = Test, \forall st \in St \setminus \{Delete, Create, Change\}$
- Production and Deprecate are both neutral states $Ag$: a composition governance aggregator defined for an arbitrary composed service $s \in S$ and $S \ni s_{i \in N}$ its members such as $s = ancestor(s_i)$:

$$Ag: (S, A, LE) \xrightarrow{\text{def}} (P, AT), (s_x, a_x) \xrightarrow{\text{def}} Ag(s_x, a_x, le_x) := (\bigcap_{i=1}^{n} AM(s_i, a_i), \bigcup_{i=1}^{n} W(le_i)),$$

$$\text{where: } x \wedge \neg x = \neg x, \forall x \in P$$

FIG. 18

FORMULA 7: FORMAL TAXONOMY DEFINITION $$\mathbb{T} \stackrel{def}{=} (V, T, Sc, r), \quad where$$

- $V$: a finite set of vertices
- $T$: a finite set of acyclic unidirectional transitions connecting the nodes
- $Sc$: a successor function specifying intermediate parentship – childhood relation:

$$Sc: V \stackrel{def}{\rightarrow} V, p \stackrel{def}{\rightarrow} Sc(p) = c$$

Deducing following relationsships:

Reciprocal predecessor function $Sc^{-1} = Pr: V \stackrel{def}{\rightarrow} V, c \stackrel{def}{\rightarrow} Pr(c) = p$; where $c = Sc(p)$ Boolean adjacent function $Aj: (V, V) \stackrel{def}{\rightarrow} \mathbb{B}, (n, v) \stackrel{def}{\rightarrow} Aj(n, v) = true \Leftrightarrow Pr(n) = Pr(v)$ o Distance function counting the number of connectors between two nodes:

$$Ds: (V, V) \stackrel{def}{\rightarrow} \mathbb{N}, (s, d) \stackrel{def}{\rightarrow} Ds(s, d) = n; \text{ where } s \stackrel{t_1}{\rightarrow} v_1 \stackrel{t_2}{\rightarrow} \ldots \stackrel{t_{n-1}}{\rightarrow} v_{n-1} \stackrel{t_n}{\rightarrow} d$$

- $N \ni r$ the root alias the start node of the tree

FIG. 19

FORMULA 8: SOQ TAXA MODEL $$\mathbb{T}_{SOQ} \stackrel{def}{=} (T_B, T_S, T_C), \quad where$$

- $T_B$: a business taxonomy
- $T_S$: a service taxonomy
- $T_C$: a service composition taxonomy

FIG. 20

FORMULA 9: TRANSFERABLE SHARED DATA $IOp(S) = \{iop \mid iop$ is an interface operation of service $s\}$;

the set of all interface operations of some service $s$.

$In(iop(s))$ the set of input data of some operation $iop$ of service $s$, and analog $Out(iop(s))$ the set of output data of some operation $iop$ of service $s$ $symmetric: (S,S) \stackrel{def}{\to} \mathbb{B}, (s_1,s_2) \stackrel{def}{\to} symmetric(s_1,s_2) = true \iff \exists iop_1 \in IOp(s_1), \exists iop_2 \in IOp(s_2): (Out(iop_1) \subseteq In(iop_2)) \wedge (Out(iop_2) \subseteq In(iop_1))$ $antisymmetric: (S,S) \stackrel{def}{\to} \mathbb{B}, (s_1,s_2) \stackrel{def}{\to} antisymmetric(s_1,s_2) = \neg symmetric(s_1,s_2)$

FIG. 21

FORMULA 10: ABSOLUTE TRANSFERABILITY $symmetric_{abs}: (S,S) \stackrel{def}{\to} \mathbb{B}, (s_1,s_2) \stackrel{def}{\to} symmetric_{abs}(s_1,s_2) = true \iff \forall iop_1 \in IOp(s_1), \forall iop_2 \in IOp(s_2): (Out(iop_1) \subseteq In(iop_2)) \wedge (Out(iop_2) \subseteq In(iop_1))$, and analog $antisymmetric_{abs}: (S, S) \stackrel{def}{\to} B, (s_1, s_2) \stackrel{def}{\to} antisymmetric_{abs}(s_1, s_2) = symmetric_{abs}(s_1, s_2)$

FIG. 22

FORMULA 11: TRANSFERABLE SHARED DATA $$reflexiv: S \xrightarrow{def} \mathbb{B}, s \xrightarrow{def} reflexiv(s) = true \Leftrightarrow \exists\, iop \in IOp(s): (Out(iop) \subseteq In(iop))$$

$$reflexiv_{abs}: S \xrightarrow{def} \mathbb{B}, s \xrightarrow{def} reflexiv_{abs}(s) = true \Leftrightarrow \forall\, iop \in IOp(s): (Out(iop) \subseteq In(iop))$$

$$transitiv: (S,S,S) \xrightarrow{def} \mathbb{B}, s \xrightarrow{def} transitiv(s_1, s_2, s_3) = true \Leftrightarrow \exists\, iop_{1 \leq i \leq 3} \in IOp(s_i): \Big(\big(Out(iop_1) \subseteq In(iop_2)\big) \wedge \big(Out(iop_2) \subseteq In(iop_3)\big) \Rightarrow \big(Out(iop_1) \subseteq In(iop_3)\big)\Big)$$

FIG. 23

FORMULA 12: FORMAL ONTOLOGY DEFINITION $$O \cong (N, Asc, Dd, T, Og, Lr), \quad where$$

- $N$: a finite set of tokens
- $Asc$: a finite set of associations connecting the nodes
- $Dd$: the definition domain of asc alias a set of instance resources to be associated
- $T$: the taxonomie defined above
- $Og$: a finite set of related ontologies
- $Lr$: a finite set of ontologies relating rules

FIG. 24

FORMULA 13: SERVICE CLASSIFICATION

- Service $s$ is_of_type Type $t$
- Service $s$ is_used_in Business $b$
- Service $s_1$ is_semantically_composable_with Service $s_2$

SERVICE ORIENTED QUERY AND SERVICE QUERY LANGUAGE FRAMEWORK

TECHNICAL FIELD

The technical field relates in general to service-oriented architecture, and more particularly to matching of services for composition.

BACKGROUND

A key entry point for accessing services is how they are readily made available for any kind of usage. Conventional efforts have been made for accessing services, including related contents mainly for composition purposes.

For capturing service information, a wide interdisciplinary plethora of service description attempts have taken place over the years, diverging to different context sensitive, motivation driven and restrictive requirements tailored classification threads. Many of these are summarized in Table 1, service description classifications, which is based on the "Unified Service Description Language XG Final Report," W3C Incubator Group Report 27 Oct. 2011. The efforts can be attributed to the following criteria:

- whether the scope of the effort lies in capturing information technology (IT) or business aspects of services or the whole service system.
- the purpose of the corresponding effort: is the effort geared towards normative data exchange, is the purpose of the effort to facilitate software engineering, is the purpose of the effort to automate a specific task, and/or is the purpose of the effort to act as reference model.
- whether the effort is able to capture business network relationships between services.
- whether the effort is standardized.

TABLE 1

| Effort | Scope | Purpose | Business network | Representation | Standardized |
|---|---|---|---|---|---|
| 1. Service Oriented Architectures ||||||
| WS-* | IT | Exchange | No | XML | Various |
| UDDI | IT | Exchange | No | XML | OASIS |
| SoaML | IT | Engineering | No | UML | OMG |
| UPMS | IT | Engineering | No | UML | No |
| SOA-RM | IT | Reference | No | Informal | OASIS |
| SOA Ontology | IT/Business | Reference | No | OWL | Open Group |
| WADL | IT | Exchange | No | XML | W3C |
| Core Ontology of Web Services | IT | Reference | No | OWL | No |
| 2. Semantic Web Services ||||||
| OWL-S | IT | Automation | No | OWL | No |
| WSMO | IT | Automation | No | WSML | No |
| . . . ||||||
| SAWSDL | IT | Exchange | No | XML | W3C |
| SA-REST | IT | Exchange | No | XML | W3C |
| RO-SOA | IT | Reference | No | RDFS | OASIS |
| Reference Service Model | IT | Reference | No | OWL | No |
| WSMO-Lite | IT | Automation | No | RDFS | W3C |
| MicroWSMO | IT | Exchange, Automation | No | XML | No |
| Minimal Service Model | IT | Exchange, Automation | No | RDFS | No |
| 3. Software-as-a-Service ||||||
| SML | IT | Exchange | No | XML | W3C |
| SaaS-DL | IT | Engineering | No | XML | No |
| 4. Service Networks ||||||
| OBELIX service ontology | Business | Configuration | Yes | RDFS | No |
| e3Service | Business | Configuration | Yes | RDFS | No |
| e3Value | Business | Analysis | Yes | RDFS | No |
| SNN | Business | Optimization | Yes | UML | No |
| 5. Service System ||||||
| Alter | System | Reference | No | Informal | No |
| Reference Architecture Foundation of SOA | System | Reference | No | UML | OASIS |
| Service Design Model | System | Engineering | No | ECore | No |
| Ontological Foundations of Service Science | System | Reference | No | FOL | No |
| TEXO Service Ontology | System/Business | Reference | No | OWL | No |

TABLE 1-continued

| Effort | Scope | Purpose | Business network | Representation | Standardized |
|---|---|---|---|---|---|
| 6. Economic | | | | | |
| DIN PAS 1018 | Business | Exchange | No | Informal | DIN |
| Emmrich | Business | Reference | No | UML | No |
| O'Sullivan | Business | Reference | No | ORM | No |
| Toma | Business | Automation | No | WSML | No |
| USDL | Business | Reference/ Exchange/ Engineering | No | ECore, XML | In progress |

However, there has not been an approach taken with respect to various aspects of service composition, to easily match different available services and otherwise to assist in one or more aspects of service composition. This problem becomes more important in a cloud environment with a plethora of available different services in which an appropriate composability becomes difficult to determine using merely conventional techniques.

SUMMARY

Accordingly, one or more embodiments provide a method, system and/or non-transitory computer readable medium to perform matching of services for composition. Accordingly, one embodiment disclosed herein is directed to a method to perform matching of services for composition, for use with at least one service repository in which the at least one service repository stores service definitions for a plurality of services. The method includes performing, by a query facility of a processor, an inspection of service definitions in at least one service repository. The method includes determining, by the query facility of the processor, from performing the inspection of service definitions in the at least one service repository, first attributes associated with a first service and different second attributes associated with a second service, the first and second attributes being related to syntactic aspects of the first and second services and semantic aspects of the first and second services. The method includes, by the query facility of the processor, responsive to a service oriented request which indicates the first service in the at least one service repository, determining a composability of the first and second services in accordance with a service oriented query (SOQ) framework, based on the first and second attributes associated with the first and second services and rules regarding composability of attributes, the rules being in accordance with the SOQ framework, the composability of the first and second services being determined with respect to both the syntactic aspects of the first and second services and the semantic aspects of the first and second services.

In another embodiment the syntactic aspects used by the processor to determine the composability comprise lifecycle, governance and propagation attributes; and the semantic aspects used by the processor to determine the composability comprise taxonomy and ontology attributes.

In still another embodiment, the SOQ framework is implemented as an SOQ library, further comprising executing the SOQ library, by the processor, causing the processor: to explore the attributes of the first and second services, to extract composition-relevant content from the at least one repository, and to drive a composition process using the composition-relevant content as the syntactic aspects and the semantic aspects through syntactic and semantic steps to determine the composability of the first and second services.

In yet another embodiment, the query facility is an XQuery facility, XQuery facility being extended by functionality of an SOQ library.

A further embodiment includes determining, by the processor, the composability with respect to the syntactic aspects of the first and second services before the composability with respect to the semantic aspects of the first and second services is determined; determining, by the processor, the composability with respect to the semantic aspects when the syntactic aspects of the first and second services are determined to be composable; and skipping, by the processor, a determination of the composability with respect to semantic aspects when the syntactic aspects of the first and second services are determined to not be composable, and indicating that there is no composability of the first and second services.

Still a further embodiment includes classifying, by the processor, the attributes of the first and second services based on the SOQ framework to include service lifecycle, governance, propagation, taxonomy, and ontology, which in combination indicate a best fit result for the service oriented request.

Yet a further embodiment includes providing, by the processor, a response to the service oriented request that indicates, to a user, which services in the repository are candidate services that are determined to have composability with the first service.

One or more embodiments can further comprise a service taxonomy preprocess for the semantic aspects that provides a classification scheme of service types, rules, and building solutions, capability, and utility patterns.

One or more embodiments can further comprise an ontology preprocess for the semantic aspects that is domain specific and incrementally identifies service associations using successor-predecessor relationships.

One, or a combination of more than one, or all, of the above embodiments, can be combined and provided as a single embodiment.

Another embodiment provides a computer system to perform the above, according to one or more of the above embodiments. The computer system can include at least a processor configured with the query facility that performs the above.

Yet another embodiment provides a non-transitory computer-readable medium with instructions, which when executed can perform a method according to one or more of these embodiments.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 9 is a user interface for a service explorer tree for stakeholder management, security policies, and SLA/Qos management.

FIG. 12 is formula 1, syntactical and semantical implication.

FIG. 13 is formula 2, SOQ formal definition.

FIG. 14 is formula 3, formal recursive service definition.

FIG. 15 is formula 4, formal life cycle definition.

FIG. 16 is formula 5, formal governance definition.

FIG. 17 is formula 6, formal propagation definitions.

FIG. 18 is formula 7, formal taxonomy definition.

FIG. 19 is formula 8, SOQ taxa model.

FIG. 20 is formula 9, transferable shared data.

FIG. 21 is formula 10, absolute transferability.

FIG. 22 is formula 11, transferable shared data.

FIG. 23 is formula 12, formal ontology definition.

FIG. 24 is formula 13, service classification.

DETAILED DESCRIPTION

I. Introduction

Figure 1:
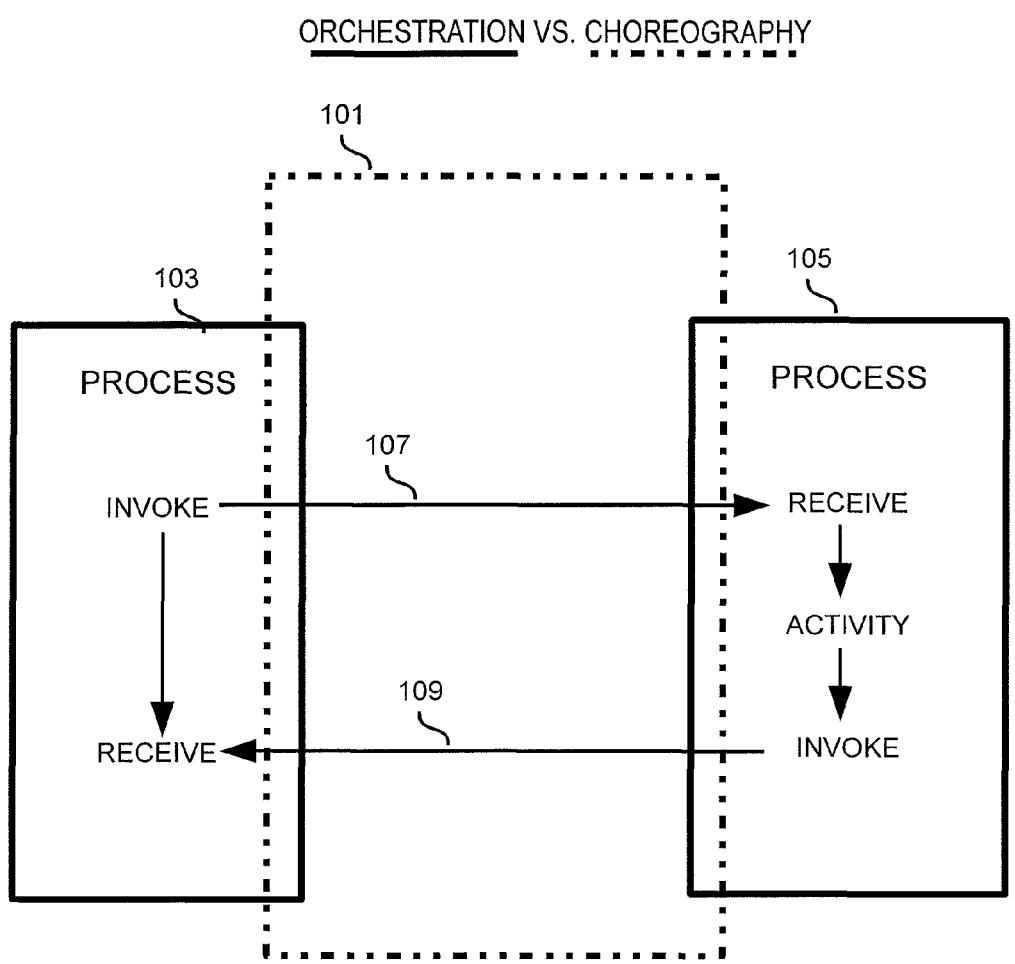
FIG. 1 is a block diagram illustrating a concept of service orchestration vs. service choreography.

In overview, the present disclosure concerns a particular way to match services for service oriented architecture (SOA), and more particularly, a service matching framework for SOA, in which a holistic approach is taken with respect to various aspects of service composition, so that a service oriented query (SOQ) may be used to correctly match different available services and otherwise to assist in one or more aspects of service composition, based on, for example, attributes derived from service definitions associated with a service and which have different syntactic aspects such as one or more of lifecycle, governance, and propagation, and different semantic aspects such as one or more of taxonomy and ontology.

This disclosure accentuates a special role assigned to services as de facto autonomous loosely coupled granular core web entities, and highlights a straightforward manner to query and access any kind of information within this context.

More particularly, various inventive concepts and principles can target the extraction of relevant information content, so as to simplify service access and reduce service usage complexity (and possibility its related time to market aspect) for service composition issues, such as within a restricted ecosystem of federated service repository pools and network or possibly internet-wide in a more general environment.

One or more embodiments can address the issues posed by not only service specification diversity and fragmentation, but also the related description overhead, to maintain focus on the scope of service reusability and recycling as well as combination possibilities. In this way, the creation of robust and more powerful low-cost cooperative services is promoted, such as for agile and competitive dynamic web applications and processes.

A service oriented query (SOQ) in the manner of a service-oriented architecture (SOA) will be presented as a design issue to illustrate this approach, and an appropriate implementation driven through a Query-As-A-Service feature will be introduced. These are intended to be examples which illustrate the approach; variations and evolutions thereof will be appreciated by those of skill in the art.

Further in accordance with exemplary embodiments, a service orientated paradigm introduces in general a new process and related steps that decouple cross-platform computation through the combination of already existing services, instead of writing new code for entire applications and/or to determine composability of various combinations of services. One or more embodiments can, among other things, cover some or the entirety of the spectrum of the canonical software development life cycle in the service-oriented-X (SOX) family, such as starting with service-oriented architecture (SOA) for architecture and design, and going through service-oriented engineering (SOE) for engineering to achieve service-oriented computing (SOC) for the underlying computation.

II. Problem Presentation, Observations, and Solution Overview

A. Background Motivation

Almost everything within the service-oriented architecture (SOA) context is based primarily on decoupled core units which can reduce the impact of distributed network computation through common collaborative cross-environment services. This convergence model, however, is juxtaposed at the same time to a complementary divergence of the associated specifications and definitions, which magnifies the complexity of service access and usage.

The approach herein follows a manageable way to encompass this potentially massive divergence through the introduction of a Service Oriented Query (SOQ), not only for the sake of completeness of the service-oriented X (SOX) family, but also for coping with the dispersed information as well as its heterogeneous model and content, and especially for service composition purposes beside common usage issues.

B. Service Composition

Service composition in general plays a key role within SOA and in particular within the service oriented computing paradigm. Since individual services are primordial and not conceived to interact with other counterparts, conventional service composition consists of message exchange on-demand according to some prescribed integration business logic carried from an enterprise service bus (ESB), such as for data routing, conversion and adaptation. This section II explores the inventor's observations about conventional approaches, as a comparison to and motivation for the inventive concepts and practical embodiments discussed herein.

Service composition comprises the following two approaches:

Service Orchestration

Service Choreography

FIG. 1 illustrates service composition types, namely, service orchestration 101 (shown with the solid line) and service choreography 103, 105 (shown with the dashed line). The parts in FIG. 1 represent the main details of these composition types, respectively. In service orchestration 103, 105, a process (represented here by two processes) each its own independent sequence of steps. In service choreography 101, two or more different services coordinate their steps, for example, using messages 107, 109.

Figure 2:
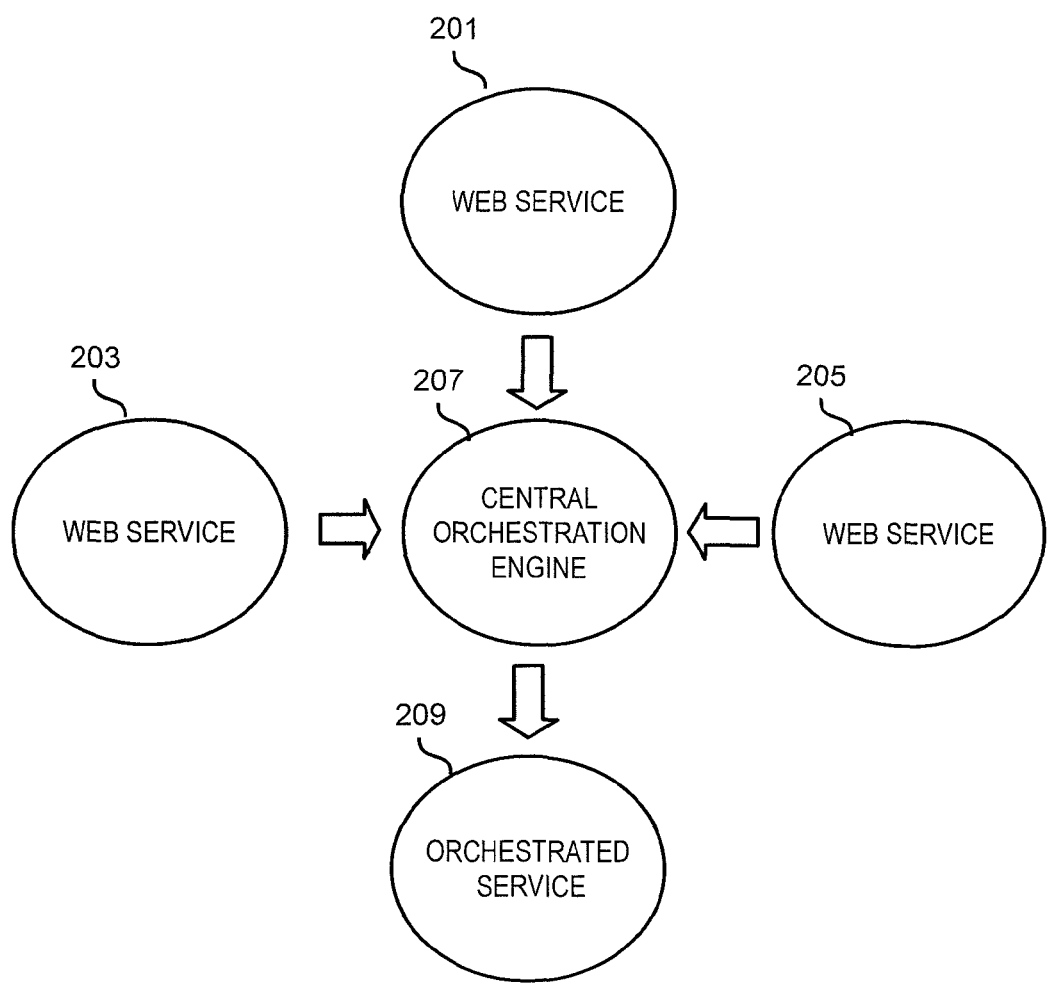
FIG. 2 is a data flow diagram illustrating service orchestration.
Figure 3:
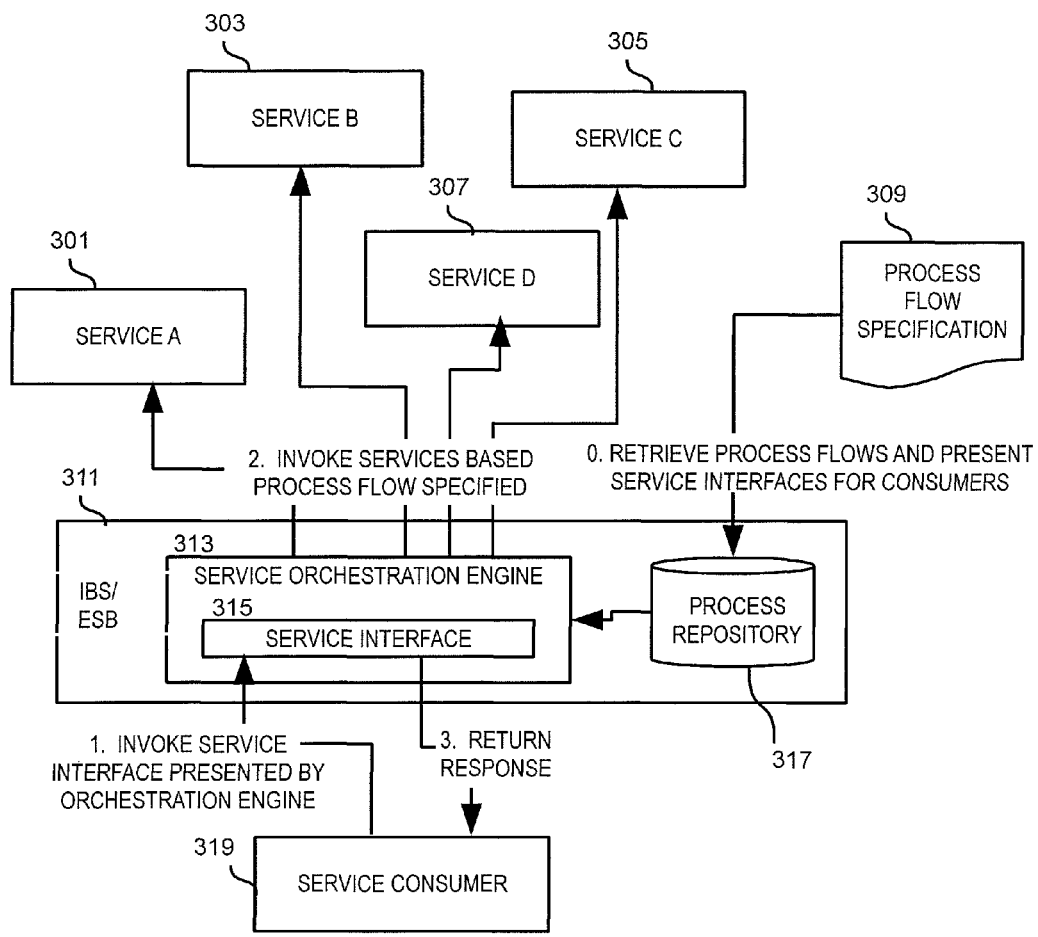
FIG. 3 is another data flow diagram illustrating an example service orchestration scenario.
Figure 4:
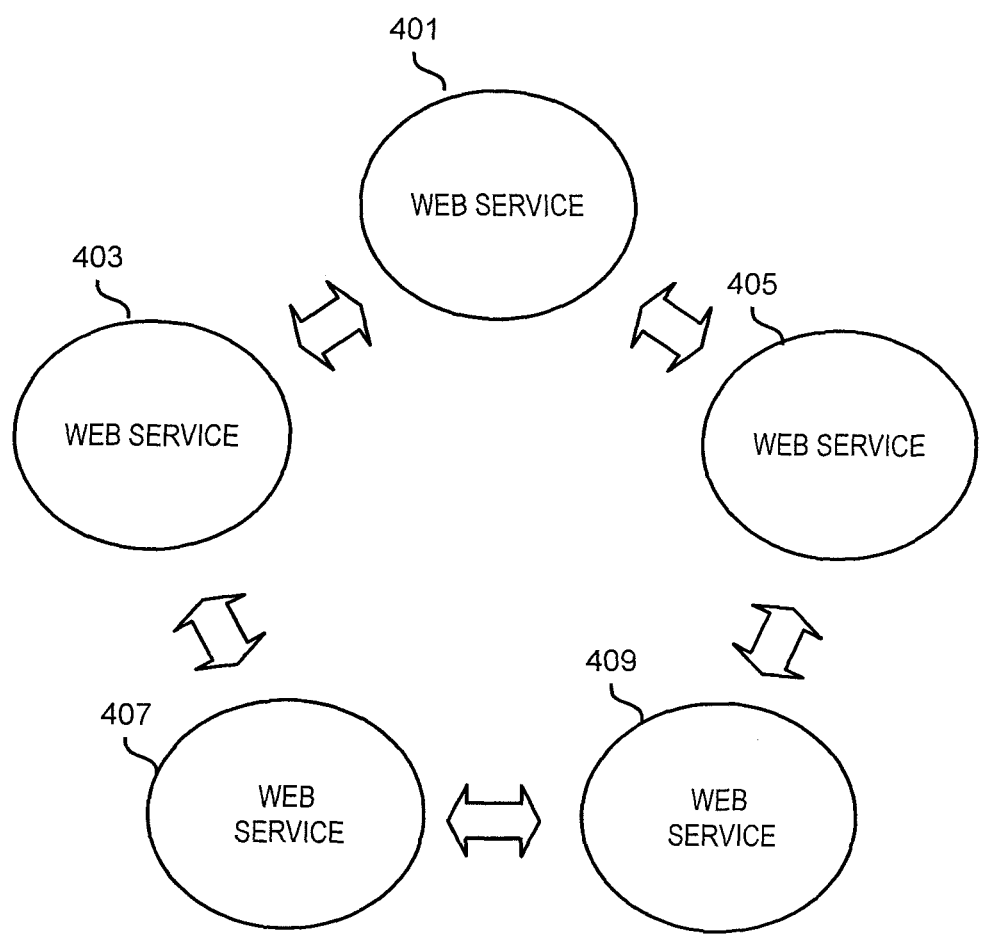
FIG. 4 is a data flow diagram illustrating service choreography.
Figure 5:
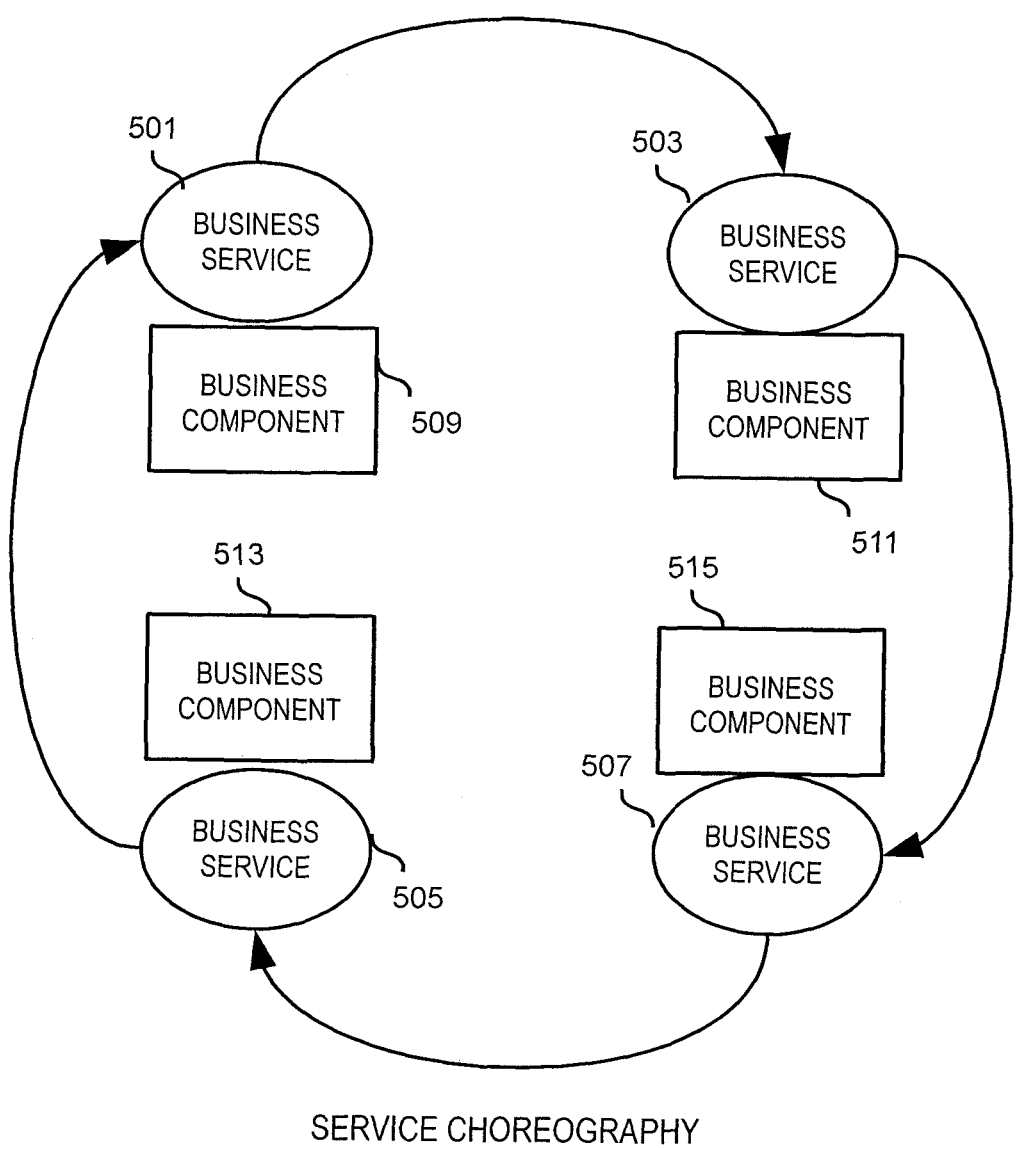
FIG. 5 is another data flow diagram illustrating another aspect of service choreography.

FIG. 2 illustrates service orchestration, FIG. 3 is an example service orchestration scenario, and FIG. 4 is a counterpart of FIG. 2 but illustrating service choreography, and FIG. 5 is an example service choreography scenario. Each of these are discussed in the follow sections.

1. Service Orchestration

A conceptual diagram of service orchestration is illustrated in FIG. 2. Service orchestration includes the coordination and arrangement of multiple services as well as the combination of their related interactions, which are collectively exposed as a single aggregate higher-level service or "second-generation" application, as is understood in this field. Services are, in this case, passive, having no claim about their usage and interaction. Instead they are mastered through a central orchestrator managing execution, controlling communication and aligning message traffic. Orchestration is the most common approach used so far including standards like business process model and notation (BPMN) and business process execution language (BPEL).

In FIG. 2, execution of and communication between services represented by web services 201, 203, 205 and orchestrated service 209 are mastered through a central orchestration engine 207.

An example of a service orchestration scenario is illustrated in FIG. 3. FIG. 3 shows representative services A-D 301, 303, 305, 307, a process flow specification 309, an IBS/ESB (Integration Broker Suite/Enterprise Service Bus) 311 and a service consumer 319. The IBS/ESB 311 includes a service orchestration engine 313 which incorporates a service interface 315, and a process repository 317. At step 0, the process flow specification 309 retrieves process flows and presents service interfaces for consumers. At step 1, the service consumer 319 invokes the service interface 315 presented by the service orchestration engine 313. At step 2, the service orchestration engine 313 invokes services 301, 303, 305, 307 309, based on the specified process flow. At step 3, the service interface returns a response to the service consumer 319.

2. Service Choreography

A conceptual diagram of service choreography is illustrated in FIG. 4. In FIG. 4, there are provided five different web services 401, 403, 405, 407, 409. Within service choreography, by comparison to service orchestration, the services 401, 403, 405, 407, 409 are active participants and consequently are aware about their assignments and calls, which are illustrated as being to each other. The most obvious and straightforward way to illustrate choreography and distinguish it from orchestration is the composition of orchestrators, being themselves services too.

FIG. 5 illustrates additional concepts regarding a service choreography scenario and a flow between services. In FIG. 5, each of business services 501, 503, 505, 507 is associated with its own business component 509, 511, 513, 515. The business service 501, 503, 505, 507 can communicate with other business services. However, the business components 509, 511, 513, 515 associated with each business service are not accessed by the other business services.

C. Introductive Use Case

Many small and medium businesses (SMB's) are overwhelmed with aggressive price directives, which are prescribed somehow implicitly from the various price search engines. Especially, the traditional shops with a classical type of trade, such as at the corner of the street, are looking for ways to hold on, which means competing with internet dumping prices and not only through their consulting efforts on site. Even worse, when customers look for some kind of commitment and seek advice for some products from this supplier, the customers may achieve their deal online somewhere else afterwards.

A suitable scenario for such a supplier facing this situation is to start as soon as possible with multi-channel marketing, retailing online and at the same time and primarily to look for a way to permanently access specific offers from some appropriate search engines and to collect related information for products as well as prices and to merge everything in a comparison matrix in order to keep the prices properly tuned and up to date so that they can be competitive in today's environment.

In terms of SOA, however, it may be desirable to provide at least a primary service enabling the access of price search engines, at least the prominent and/or meta ones, coupled with a downstream service to summarize the collected results in a tailored mash up.

Moreover, the supplier may be looking for a low-cost solution ideally on demand or at least for a short period of time especially around Christmas, Easter, summer holiday, winter sales and the like, possibly just restricted to shops within a localized region such as DACH (generally Germany-Austria-Switzerland) or the European Community at most. With these considerations, the desired query may be completely formulated using a common sense approach through steps such as the following:

find a service to access search price engines; may be calling their own released services if any, or alternatively connecting to their databases or simply getting their released data in some specified format parameterize the call with a list of products or a category, possibly with a price range and even more within some specified local area, optionally for a specified period of time The provider, on the other hand, may request a corresponding solution so as to start looking within some kind of repository pool to read descriptions, check technical specifications and so forth, even though most of this work overhead can be carried out automatically. Again, the corresponding service specific formal query may be formulated from this common sense request, taking into account all the kind of metadata used for service definition.

A rudimentary modus operandi is the elaboration of a large relational data base to store data regarding all kinds of services and their related components, making a universal scheme to cope with all the different types available, as has been suggested. It is consequently possible, for example, to initially pick up syntactically composable service candidates, and to access all the data with corresponding SQL statements such as in Listing 1, an example SQL statement for syntactically composable services:

Listing 1:
Select distinct S1.Id, S1.Name from Service S1, Service S2, Method M1, Method M2
 Where S1.description like "%price%search%engine %"
 And S2.description like "%eval%report%output%"
 And M1.description like "%price%search%engine%"
 And M2.description like "%eval%report%output%"
 And M1.ServiceId=S1.Id
 And M2.ServiceId=S2.Id
 And ((select count(*) from Input where MethodId=M2.Id)<=(select count(*) from Output where MethodId=M1.Id))
 And ((select type from Input where MethodId=M2.Id) in (select type from Output where MethodId=M1.Id))

This duplicated mapping of services along with all their sub-ordered constituents, into, for example, a relational database, will necessitate a very large overhead resulting, ultimately resulting in an unjustifiable situation considering the fact that services are already defined and validated well enough and there is absolutely no need to redefine them once again under a different scope, increasing this way, with additional update tasks, the global complexity of usage, which is already quite high enough.

On the other hand almost all available services are not only specified but also described in XML or an XML-like dialect, which provides a reason to fine tune corresponding mechanisms in order to extract the information that meets the composition requirements. One obvious way is to distribute the available specifications as well as descriptions generally straight over some pools of federated repositories to ensure a high level of availability and accessibility. Indeed, most of the languages listed in Table 1 rely directly or indirectly on XML and even when missing, there are many possibilities to transform the source definition into an equivalent XML pendant. Furthermore, to avoid restricting service descriptions to XML and derived dialects, definitions can be, in addition, converted to conform to JSON format to enable more access and a multiplicity of ways of treatment.

This case is indeed more straightforward; nevertheless it also requires a massive navigation overhead through all of the XML items definitions. Thus, what is needed are more elaborated methods that directly address the right service components to support the resolution of, for example, finding composable services and promoting a flexible handling of similar processes.

Under such circumstances, an appropriate query language that covers specifics and peculiarities can build an adequate solution, for example to handle needs and wants of the entire all around service management and especially composition matters. Instead of duplicating all the items in order to just establish classical SQL queries, this approach will take the other way around and build a specialized service query language referred to herein as SerQuel (pronounced as "circle"). SerQuel can invoke an encapsulated request equivalent to the SQL pendant mentioned above, as for example in the following Listing 2, a SerQuel statement for syntactically composable services:

Listing 2:
For distinct Services s1 and s2 from serviceList1 where s1 is_syntactically_composable with s2 return s1.name, s1.id, s2.name, s2.id The encapsulated statement of Listing 2 shows, although, only the syntactical convenience as a common aspect of service composition. Service usage as a whole is still bound to many other conditions such as permissions, security constraints, service-level agreement (SLA) commitments and the like that have been not addressed in prior attempts of this approach and that will be covered in depth within the SOQ paradigm discussed herein in the subsequent sections.

D. Background Art

There have been no attempts so far to elaborate a particular formal query language tailored to service composition, for at least the most used information exchanges services on the web such as SOAP and RESTFul. Nevertheless, there are some approaches in connection with this issue (querying services) for the aim of subsequent composition. The solutions, however, focus first and foremost on semantic aspects and natural query language pursuing a Top-Down method.

The Top-Down method makes the subject of a highly abstract attempt to acknowledge general theoretical aspects of service composition, which however does not reflect what the global service market situation looks like, how services are implemented and published and what kind of techniques and benchmarks are used the most. Furthermore, almost all the previous theoretical and technical papers so far follow a strongly restrictive path, putting the emphasis pointedly and exclusively on the technical service interface without taking decisive real word issues into account such as SLA commitments, security matters or global life cycle management and the like.

A general overview of the related work already accomplished in connection with this issue is summarized in Table 2, which is a comparison matrix of the background art.

TABLE 2

| Subject | Issue | Comment |
| --- | --- | --- |
| Service Composition based on natural language request | Templated Natural Language Service Composer to lead to a technical valid service composition | Technical composition only |
| On-the fly construction of web services compositions from natural language request. | Dedicated ontology-based service description with keyword extended natural language request | Technical composition only |
| Web service with associated lexical tree | Marked up semantic graph with predefined vocabulary for service retrieval with associated lexical tree | Technical composition only |

TABLE 2-continued

| Subject | Issue | Comment |
|---|---|---|
| Semantics-based dynamic service composition | Natural language semantic graph and ontology based service composition operating on data types | Technical composition only |
| Service-Oriented Architecture: Introducing a Query Language | Conceptual approach focusing on service and service resources | Service retrieval without targeting composition |
| The Unified Service Query Language (Tsalgatidou et Al, 2006) (Pantazoglou & Tsalgatidou 2009). | Conceptual approach for a cross-format service discovery | Service retrieval without targeting composition |
| CLIDE: Interactive Query Formulation for Service Oriented Architecture. | Authoring system focusing on service query building | Technical composition |
| Towards service oriented continuous queries in pervasive systems. | RDBMS-Compliant mechanism preprocessing virtual table for SQL-Like service and resources query | Query-centric. |

The approach taken here, however, contemplates composition and service metadata access Bottom-Up, taking available specifications and descriptions as data sources so as to elaborate suitable queries in order to pick up qualitatively just the right type and quantitatively as much amount of result information as needed. This approach also covers, within the SOQ-design, agile constraints and life cycle requirements such bug fixing, change requests, and the like.

In summary, conventional techniques operate primarily on the user side, whereas the solution here works on the service side. Furthermore, both approaches could be combined together, making the solution suggested herein as a post process for the natural language step and a preprocess for service access and composition.

E. Background Motivation

As already mentioned previously, for the sake of simplicity, we will just focus on the following particular known service formats and related items on the web wire:

SOAP services
RESTFul services
USDL services
BPMN
BPEL
Xquery

Each of the above is discussed below. For ease of understanding, in this discussion, XML will be taken as de facto standard description language for at least the most used (web) services web wide, to clarify how queries can be suitably extrapolated to extract the relevant information. However, the principles discussed herein may be expanded beyond XML.

1. SOAP Services

SOAP (Simple Object Access Protocol) is a protocol specification for exchanging structured information in the implementation of Web Services in computer networks. It relies on the XML Information Set for its message format, and usually relies on other Application Layer protocols, most notably Hypertext Transfer Protocol (HTTP) or Simple Mail Transfer Protocol (SMTP), for message negotiation and transmission.

2. RESTFul Services

Representational state transfer (REST) is a conventional architectural style consisting of a coordinated set of architectural constraints applied to components, connectors, and data elements, within a distributed hypermedia system. REST ignores the details of component implementation and protocol syntax in order to focus on the roles of components, the constraints upon their interaction with other components, and their interpretation of significant data elements.

REST has been applied to describe desired web architectures, to identify existing problems, to compare alternative solutions and to ensure that protocol extensions would not violate the core constraints that make the Web successful. Fielding used REST to design HTTP 1.1 and Uniform Resource Identifiers (URI). The REST architectural style is also applied to the development of Web services as an alternative to other distributed-computing specifications such as SOAP.

3. USDL Services

The Unified Service Description Language (USDL) is a well known, platform-neutral language for describing services. It was consolidated from SAP Research projects (FAST, RESERVOIR, MASTER, ServFace, SHAPE, SLA@SOI, SOA4ALL) concerning services-related research as an enabler for wide leverage of services on the Internet. SAP Research believes that with the rise of commoditized, on-demand services, the stage is set for the acceleration of and access to services on an Internet scale. It is provided by major investments through public co-funded projects, under the Internet of Services leitmotif, where services from various domains including cloud computing, service marketplaces and business networks, have been investigated for access, repurposing and trading in large settings.

The kinds of services targeted for coverage through USDL include:

purely human/professional (e.g. project management and consultancy),
transactional (e.g. purchase order requisition),
informational (e.g. spatial and demography look-ups),
software component (e.g. software widgets for download),
digital media (e.g. video & audio clips),
platform (e.g. middleware services such as message store-forward) and
infrastructure (e.g. CPU and storage services).

4. BPMN

Business Process Model and Notation (BPMN) is a conventional standard for business process modeling that provides a graphical notation for specifying business processes in a Business Process Diagram (BPD), based on a flow-charting technique very similar to activity diagrams from Unified Modeling Language (UML). The objective of BPMN is to support business process management, for both technical and business users, by providing a notation that is intuitive to business users, yet able to represent complex process semantics. The BPMN specification also provides a mapping between the graphics of the notation and the underlying constructs of execution languages, particularly Business Process Execution Language (BPEL).

The primary goal of BPMN is to provide a standard notation readily understandable by all business stakeholders, especially the following ternary:
 the business analysts who create and refine the processes,
 the technical developers responsible for implementing them, and
 the business managers who monitor and manage them.

Consequently, BPMN serves as a common language, bridging the communication gap that frequently occurs between business process design and implementation.

Currently there are several competing standards for business process modeling languages used by modeling tools and processes. Widespread adoption of the BPMN will help unify the expression of basic business process concepts (for example, public and private processes, choreographies), as well as advanced process concepts (for example, exception handling, transaction compensation).

5. Business Process Execution Language (BPEL)

One can describe Web-service interactions in two ways: as executable and as abstract business processes respectively. An executable business process models an actual behavior of a participant in a business interaction. Abstract business processes are partially specified processes that are not intended to be executed. An Abstract Process may hide some of the required concrete operational details. Abstract Processes serve a descriptive role, with more than one possible use case, including observable behavior and/or a process template. Web Services Business Process execution Language (WS-BPEL) aims to model the behavior of both executable and abstract processes.

WS-BPEL provides a conventional language for the specification of Executable and Abstract business processes. By doing so, it extends the Web Services interaction model and enables it to support business transactions. WS-BPEL defines an interoperable integration model that should facilitate the expansion of automated process integration both within and between businesses.

6. XQuery

There are many possibilities to build a suitable query language even from scratch, but we aim and tend to follow one of the object-orientation paradigm which reuses already common widespread benchmarks and approved best practices standards as well as established blueprints.

Due to the proliferation of the XML format throughout the service landscape it may be desirable to use XQuery as a fundamental platform and language processor to build appropriate queries which address the information content relevant for general service use and special purposes, mainly service composition as cited many times in this disclosure.

XQuery enables, by means of its known underlined xpath utilities, the access of all kinds of XML definitions without any exceptions. Thus only the related XML schemes are needed to lexically parse the corresponding service description according to the query being processed.

III. Service Oriented Query (SOQ)

Service Oriented Query consists of a part of the SOA paradigm which faces real world behavior of service autonomy, composability and discoverability, aligning these major issues at an abstract level to derive a generic query scope for concrete, useful, market-driven service composition transparency and simplification.

As already stated above, this document focuses on XML as the most widespread service description format and XQuery as a convenient query processor. Some points of view will be highlighted later in the following parts, using XQuery in general and building a conceptual query language all around services.

This section III and subsequent section IV further explain the concepts with regard to a service oriented query and service query language framework, which can be used for matching of services for composition, followed by section V which discusses an implementation environment.

A. Case Study

XQuery can be used from scratch to perform suitable queries for accessing the information contained within a service description. This step requires a high level of programming effort resulting in sets of statements that are simply incomprehensible and far from being easy to interpret and understand.

Moreover, establishing an XQuery based platform just covers only the syntactical aspect of composition matters. Composition, however, is mainly based on the semantic nature of the sub-ordered services to be combined. This can be mathematically formulated as in FIG. 12, Formula 1, Syntactical and semantical implication.

This means that the semantic composability criterion is by far logically stronger than its syntactical counterpart. This premise leads to an additional severely restrictive constraint that builds the heart of composition as such.

Consequently, an additional layer upon the pure XQuery interface is needed, taken as an extension or built-in modules in a macro like structure for example, to cover the different XML description formats available for services on one hand and to otherwise tackle the description semantics for coherent query results.

B. SOQ Design

Service Oriented Query (SOQ), as stated before, is seen as part of the more general SOA paradigm dealing with service metadata accessibility and general composability issues under a governance point of view. Service composition in reality is a very complex task that goes beyond the simple technical match. SLA constraints, security requirements as well as global policy conditions, to name a few, can emerge into the intended matchmaking.

1. SOQ Formal Definition

In contrast to SOA, we assign SOQ a formal definition instead of passing general design principles just to keep on facing real world issues and tackling concrete service composition topics. In terms of the mathematical set theory, SOQ can be reduced to an extensible seven-digit tuple as in FIG. 13, Formula 2: SOQ formal definition.

The SOQ building blocks listed above will be respectively described in detail in the next parts. It is desirable to strategically maintain all the individual composites as expandable, in order to effectively fulfill future requirements and adequately fit to the evolution path as long as services keep on being continually tuned up and adapted according to various change and improvement requests.

From the formal definition presented above, the following triple classification can be deduced:
 A pure technical part covering the first four items; namely services, life cycle management, governance and propagation in general terms
 A nontechnical section built from the duo taxonomy and ontology A hybrid part combining the two previous ones mentioned just above to collect the appropriate information for an overall best fit result to a service specific query.

As for the two first classes there is almost nothing special to talk about as far as the prior arts cited above in this disclosure to partially refer to, at least a subset with the exception of Life cycle, governance and propagation issues. The technical part addresses the syntactical structure of services within corresponding or even federated ecosystems whereas the counterpart focuses on service semantics.

The query part is an important component, and as such consists of a new aspect taking into account all the contributing parts all around services, more especially usage and composition. New in this context is addressing not only service semantics or a subset of the syntactical structure apart, but also permanently keeping all information accessible and referenced so as to be available for services.

The following sections will summarize the two first parts to give a general idea about relevant issues to service query, and then put the spotlight mainly on the query language definition illustrating the most important steps to establish a corresponding robust framework.

2. Service

Service designates in this case the whole set of resources available for its definition without ambiguity. In formal terms a service can be recursively incremented through the triple encapsulation of FIG. 14, Formula 3, Formal Recursive Service Definition which covers a finite set of formatted statements for service description; a finite set of schemes for format, structure and type definition used for the services; and a finite set of all associated service composites.

The schemes are related to standard specifications that are commonly shared through the whole XML community. The schemes as well as the associated composites are referenced through corresponding links to directly address the current valid content and keep the whole definition in a consistent state.

The service description shows the required information, comprising a textual summary, endpoints and the technical interface, to name a few, for consume or intermediate usage, further composition, or federated usage under other policy conditions, for example.

3. Life Cycle Management

The classical life cycle management known from the former traditional software engineering is only applicable in a very restricted manner within the current loosely coupled services ecosystem. It can be adapted to the new requirements imposed from the transition towards services usage.

The life cycle management is especially exposed to the following specific challenges:

Agile iterative software engineering for composed and composite services
Suitable service composition aware version control
Composition rapid prototyping
Review, feedback evaluation and lessons learned for a complete improvement
Continuous observing of competitors and competing services For the sake of simplicity, the life cycle can be maintained in a service own local scope. The impact of the state transition can be driven through the propagation feature that is defined below. The life cycle describes the dynamic behavior of the service state transition. In a common sense, a service passes through the following stages:

Creation
Change
Test
Production
Deprecate
Delete

The creation is an absolutely initial step and delete is a closing state. Deprecate is a place holder for either backward or forward compatibility, intended to reduce the impact of irrelevant heavy alignments keeping the service just stagnating. A service usually makes the subject of continuous tuning due to improvement or change requests iteratively moving through change, test and production.

Additional states can also be taken in consideration for specific tasks like downgrade, for example, but such discrete transitions are already included within the change step, making this way the states listed above to be a basic minimal normed set of states that covers all kind of transitions such as stated in Table 3, a life cycle state transition matrix.

TABLE 3

| | | Destination | | | | |
|---|---|---|---|---|---|---|
| | | Creation | Change | Test | Production | Deprecate | Delete |
| Source | Creation | | | ^ | | | ^ |
| | Change | | | ^ | | ^ | ^ |
| | Test | ^ | | | ^ | ^ | ^ |
| | Production | ^ | ^ | | | ^ | ^ |
| | Deprecate | ^ | ^ | | | | ^ |
| | Delete | | | | | | |

In formal terms, a life cycle can be defined as in FIG. 15, Formula 4, Formal Life Cycle Definition.

Without loss of generality, it is quite possible to make the change and test steps readdressing themselves respectively reflexive but this can be translated as an implicit transition that may be hard to recover and that has to be avoided in order to keep a clear track about the state transitions and versioning progress.

4. Governance

Service governance can be a quite critical endeavor that covers general security issues, safety rules and service usage instructions under a wider cross-stakeholder governance. It can be a control instance with two major components; a static and a dynamic one. Statically it can restrict service access in general to authorized users within a role sensitive scope and under predefined level agreements conventionally referred to as SLA's. The dynamic part however can be subsumed as an event driven workflow to trigger specific actions such as notification or approval.

Governance may be a tuple defined formally as in FIG. 16, Formula 5, Formal Governance Definition.

Service Level Agreements, as being event driven to meet consumer usage commitments, can be included this way within the workflow component. Risk and compliance can also be derived from the generic workflow to extend the scope of governance and capture more enterprise specific service and process issues.

5. Propagation

Propagation describes the dynamic behavior of various service changes and the related impact of microscopic modifications within a corresponding composition tree which maps the local scoped service member changes to the macroscopic composite context.

Due to the mutual interdependence of services within a composition, context propagation is about composition life cycle management and composition governance, thus where the changes take place either for the service as a piece of a runnable entity or for its bounded usage constraints.

Strictly speaking, there are three propagation directions; Top-Down, Bottom-Up and side-to side, but purposes herein only Bottom-Up is relevant, starting from the atomic service members as the leaves of a composition tree up to the composed service as the tree root.

The service changes propagation is in general subtractive, reducing the global state and usage of the whole composition services to the lowest common denominator. Only the workflow item makes, in this sense, an exception though, being additive because each composing service is bound to its own triggering events and their associated actions. Furthermore metrics, for example, have to be collected and subsumed for performance measures and SLA commitment checks, where no restrictions at all are allowed.

Propagation in this case is all about the aggregation of life cycle states and governance constraints. The versioning item plays however a minor role, because it is subject to collaborative conventions between the cooperating stakeholders. In formal terms propagation can be defined as the tuple shown in FIG. 17, Formula 6, Formal Propagation Definition.

Propagation is kept generic this way, allowing the integration of additional mechanisms such as, for example, subsuming trivial events such as pure informative notifications for related subscribers, to a minimum on a higher level.

6. Taxonomy

Taxonomy is the first step towards semantic service classification. Building a taxonomy can be, in general, a semi-automatic task and it can be involved as a preprocess for (ideally) a full automated ontology construction. Taxonomy is monolithic in definition but polylithic in action, making it the subject of a collaborative interdisciplinary model.

This section does not focus on the formal presentation of taxonomy. Nevertheless, for the sake of completeness, taxonomy is described through a hierarchical tree structure as in FIG. 18, Formula 7, Formal Taxonomy Definition.

Figure 6:
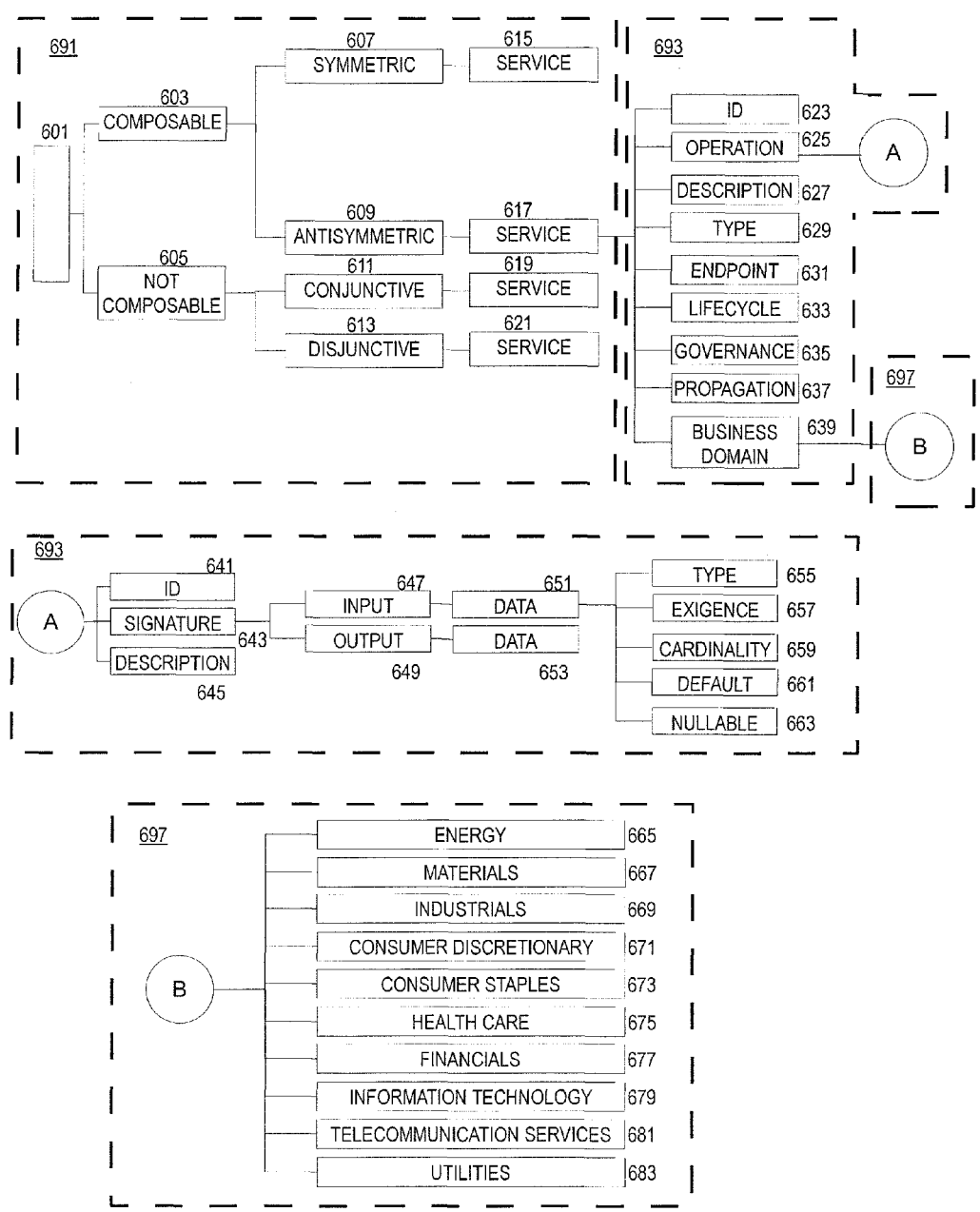
FIG. 6 is an example service query framework.

Within SOQ, we break the target taxon down to a Taxa model such as in FIG. 19, Formula 8 (SOQ Taxa Model), which a coherent three layer separation concerning the service query framework such as illustrated in FIG. 6.

As illustrated in FIG. 6, a three-level SOQ taxonomy model can include a service composition 601. It should be understood that the taxonomy model of FIG. 6 is representative and can be adapted as desired. In FIG. 6, service composition 691 defines the type of services. The service composition 601 may be further defined as composable 603 or not composable 605; the definition of composable or not composable is with respect to another services. Composable 603 can be further defined as symmetric 607 or antisymmetric 609. Symmetric 607 can be defined as a service. Antisymmetric 609 can be defined as a service 617. Not composable can be defined as conjunctive 611 or disjunctive 613. Not composable 605 can be defined as a service 619. Disjunctive 613 can be defined as a service 621.

Any of the services 615, 617, 619, 621 can be further defined with attributes 693 which are associated with the service. In this example, attributes 693 include ID 623, operation 625, description 627, type 629, endpoint 631, lifecycle 633, governance 635, propagation 637, and/or business domain 639. The attribute operation 625 can be further defined as ID 641, signature 643, and/or description 645. The attribute which signature 643 may be further defined by input 647 and/or output 649. The attributes input and output 647, 649 can be further defined by data 651, 653. The data 651, 653 of the input/output can be further defined by, for example, type 655, exigence 657, cardinality 659, default 661 and/or nullable 663.

The attribute which is business domain 639 can be further defined by one or more of types of businesses 697, in this example, energy 665, materials 667, industrials 669, consumer discretionary 671, consumer staples 673, health care 675, financials 677, information technology 679, telecommunication services 681, and/or utilities 683. The specifics of the types of business 697 can be adapted as desired.

The aim behind this modular characterization is to keep the single taxonomies independently tunable from each other, linking them separately to similar established best practice pendants for example, such as already done for the business component as described further down.

Beside the traditional manual content maintenance, suitable algorithms can address the single taxonomies separately to automatically extract the needed metadata from already existing services as well as corresponding compositions and allocate the computed results within the most appropriate branch.

6.a Service Composition Taxonomy

Exploring technical interfaces for services, the following four categories can be distinguished:

Symmetric services
Antisymmetric services
Conjunctive services
Disjunctive services Disjunctive services are neither composable nor does it make any sense to enforce the need to be composable as long as they pairwise share nothing in common. Conjunctive services are just partially composable and depend on an intermediate broker instance for an integral and complete data transformation as expected to ensure a sound and consistent composition.

For two given services otherwise, namely symmetric and antisymmetric services, assuming without loss of generality, composability is straightforward when shared data is transferable without any adaptation in the middle, such as defined in FIG. 20, Formula 9, Transferable Shared Data.

This definition can be refined one more step, casting symmetry as a weak or relative one, just to deduce a stronger or an absolute variant of it, under the same assumptions above, as in FIG. 21, Formula 10, Absolute Transferability.

Advanced Note

With a prior suitable strategic infrastructure, it is worth considering reflexivity as one more strong unary characteristic as well as introducing transitivity along the same scheme above as in the following FIG. 22, Formula 11, Reflexivity and Transivity Extension.

In the case of symmetry, we have equivalence classes with a corresponding representative service each, whose composition process results can be applied to all the related delegates without repeating the whole procedures. With antisymmetry, however, we have ordered sets with minimal and maximal services, where similar results, like the above-mentioned one, can also be achieved just to reduce the overall composition computation to a basic representative set of services.

6.b Service Taxonomy

The service taxonomy is a preliminary process in order to provide a generic classification scheme of service types, rules, building solutions as well as capability and utility patterns. It is a preprocess collecting available services identifying provision, consume and the general evolution of services.

6.c Business Taxonomy

This taxon is the first step towards semantic service assignment and composability refinement. It is a further tuning up of the previous service taxonomy described above and can be a preprocess for the establishment of an appropriate ontology for sound, useful and/or market-driven composition issues.

7. Ontology

With taxonomy, we just statically covered the syntactic aspect of service composition, broaching partially semantic behavior in a first superficial low level through an initial alignment with business domains. Ontology is, however, assigned a dynamic incremental process with a gradually increasing learning curve iterated at its best on global federated service composition activities.

The semantic predicate is, however, a wide spread discipline that cannot be captured from within just one stand-alone ontology, which is not sufficiently complete to catch all the sensitive aspects of service usage context. Thus, for our purpose, we focus on a domain specific ontology for service composition that contributes, with other related ones, to a subsumed upper ontology.

The main challenge we face with the ontological issue is the unique identification of particularly fuzzy service associations through plausible pattern matching, ambiguity minimization and contradiction resolving. In formal terms the service composition ontology can be defined as in FIG. 23, Formula 12, Formal Ontology Definition.

Ontology is a complex, expandable, heterogeneous network affecting at least the most relevant items all around services and their usage. It encompasses the services themselves beside foremost their respective types, business domains to which they are related and their corresponding compositions states.

On the subject of composition state, ab initio the ontology can automatically be built upon the statuses of the involved services, collecting the current composition activities already met. Not only at the beginning for the sake of consistency, the ontology in general can be synchronized with composition tasks through an automatic event driven replication, for example.

For the start, the nodes are extracted from the three classes: services, service types and business domains. The most generic associations that can be derived from such a constellation beside the implicit relations from the underlined taxonomy are as illustrated in FIG. 24, Formula 13, Service Classification.

From this constellation, further associations can be derived to follow up with bilateral parenthood-childhood relations or more generally hierarchy level specified successor-predecessor relationship.

8. Service Query Framework

The framework represented here is a generic library, containing a set of fundamental query functions to preliminarily explore service structure, extract any kind of information, especially the composition relevant content, and to drive the whole composition process through syntactic and semantically coherent steps as described in detail in the following sections.

For the sake of simplicity in this example, assume there is a pool of federated repositories where the whole set of services is kept accessible from the framework modules.

IV. Service Query Language Framework

The service query language introduced in this paper, designated SerQuel in the following parts, is built upon XQuery as stated in the initial part above. It extends the FLWOR expressions with imperative features to address first and foremost services and any kind of information related thereto, such as prescribed above in the SOQ paradigm.

SerQuel has a holistic character though tackling real world matters, the way services are provided, consumed and especially superposed for composition. Whereas providing and consuming consist both of a trivial issue simple to deal with, this disclosure focuses instead on the composition part as a very complicated task to address, especially under the involvement of the SOQ principles previously listed.

A. Query by Example

Before diving deep into formalities, this section aims to give an illustrative overview of some challenges covered in setting up SerQuel through key examples querying services and associated features with a pseudo format à la XQuery.

Assume we have the XML snippets taken from an USDL service description (shown in Listing 3, a USDL Logistic Service Snippet).

Listing 3:

```
...
<usdl:USDL3Document xmi:version="2.0" ...
    ...
    <services xmi:id="Service_21620273" resourceID="...">
        <interactionProtocols xsi:type="interaction:SimpleInteractionProtocol"...">
            <preDeliveryInteractions xmi:id="Interaction_21039749"
optional="false" reverse="false" triggeredFunctions="Function_21497715"
involvedRoles="Provider_29478849">
                <names xmi:id="Description_27794389" value="Do Booking"
type="name"/>
            </preDeliveryInteractions>
        </interactionProtocols>
    </services>
    <services xmi:id="Service_6208201" resourceID="http://internet-of-
services.com/usdl/20110228-M5/examples/logistics/services/carrier1-shipment-manager"
version="1.0" nature="Automated">
        <names xmi:id="Description_10496057" value="Shipment Manager"
type="name" language="EN"/>
        <publicationTime xsi:type="foundation:AbsolutePointInTime"
xmi:id="AbsolutePointInTime_11595238" value="2011-06-01T12:00:00.000+0200"/>
        <additionalDocumentation xmi:id="Artifact_30579320" type="UsersManual"
```

-continued

Listing 3:

mimeType="application/pdf"
uri="https://www.carrier1.com/wpor/web/jsp/drclinks.jsp?links=downloads/pdf/CertificationGuidelines
.pdf"/>
...
    </services>
...
</usdl:USDL3Document>

The query in Listing 4, an XQuery Like Code Extracting Elementary Service, extracts atomic services presumed the unary function is-atomic is already defined, resulting in the services listed in Listing 5, Atomic Service Result.

Listing 4:

```
Let $doc = .
For $service in $doc//.
Where is-atomic($service)
Return <atomic service> $service/name </atomic service>
```

Listing 5:

```
<atomic service>
Do Booking
Shipment Manager
</atomic service>
```

Similar queries can be attributed to pick up composed services, optionally with a selective number or range of sub-ordered services.

B. Key Service Attributes

An easy way to explore services is to provide a global library with access functions that simply address all the attributes. This is, however for our purposes, cumbersome and redundant as long as just a determined set of attributes contributes specifically to service composition. This minimal set can then later be individually extended, tuned up and customized according to specific requests to meet corresponding requirements.

In general, services are defined once within some specific repository according to an adequate data scheme to provide a minimal but sufficient service description. Further data will be extracted, distributed, collected, enhanced and generated from within pools of federated repositories each of which serves some kind of purpose, interoperating this way as an enabler of a crowd-sourcing network of service experts, reducing at the same time as much as possible the impact of ambiguous manual maintenance to keep the overall service data integrity and consistency persistent.

The minimalistic attributes are conceived in an absolute manner for service composition aside from their concrete implementation within any kind of service description following a strategic path of service providing guidelines where supplementary information may add value to the global service life cycle, instead of a strict policy that could be complicated to fulfill.

An example set of attributes, designated in this context as key attributes, broken down into the three following categories of service metadata and the related technical interface signature as well as an intermediate layer, are summarized respectively in Tables 5-7. Hence the set of functions needed for the framework and its associated generic library can be derived correspondingly.

1. Service Metadata

Table 5 illustrates Service metadata.

TABLE 5

| Label | Explanation | Addendum |
|---|---|---|
| Name | ID Reference | Mandatory |
| Description | Literal synopsis | Without a description the service is needless |
| Specification | WSDL, WADL, USDL, etc . . . | |
| Type | Atomic Composable Not composable Unspecified | Can be derived dynamically from service consume |
| Classification | Domain association | Highly recommendable |
| Tag | Annotation | Keywords may be weighted |
| Pricing | | Provider dependent |

2. Service Technical Interface

Table 6 illustrates Service Technical Interface data.

TABLE 6

| Label | Explanation | Addendum |
|---|---|---|
| Interface Methods | Accessible operations | |
| Methods input | ID and type | |
| Methods output | ID and type | |
| Life cycle stages and states | | |
| Authorization | Stakeholders and roles | |
| Authentication | Users and passwords | |
| Policies | Usage restrictions | |

3. Service Intermediate Data

These data are shared between the two types just shown above. They can be kept described separately to merge the process step accessing them at once and not multiple times. Table 7 illustrates intermediate data.

TABLE 7

| Label | Explanation | Addendum |
|---|---|---|
| Stakeholders | Provider, consumer and intermediaries | |
| SLA | Usage constraints KPI's including ranges Ranking Reputation | |
| Composites | Intermediary and Sub ordered Services and candidates | |
| Composants | Superorder services and candidates | |
| Similars | Adjacent and alternative candidates | |

C. Service Query Framework Library

As stated before, the desired access modules, at least the most generic ones, can be derived straightforwardly from the key attributes listed in the previous section. To face adequately deeper composition matters, however more elaborated access functions may be needed. Both types of functions will be treated in the following parts.

The functions will be, in the first instance, just listed without any specific implementation like details. These are reserved for the pseudo code section below. Just for the sake of completeness, suitable examples will be accordingly shown.

1. Generic Functions

To keep things as simple as possible we define the modules as unary functions taking just the service as an input argument. The output may, however, vary and may have one or more outputs, and at the latest an appropriate post process can correspondingly format a specific part of the whole result. Table 8 illustrates generic functions.

TABLE 8

| Metadata Functions | Technical Functions | Intermediate Functions |
|---|---|---|
| _ServiceName | _ServiceInterfaceMethods | _ServiceStakeholders |
| _ServiceDescription | _ServiceMethodsInput | _ServiceSLA |
| _ServiceSpecification | _ServiceMethodsOutput | _ServiceComposites |
| _ServiceType | _ServiceLifeCycle | _ServiceComposants |
| _ServiceClassification | _ServiceAuthorization | _ServiceSimilars |
| _ServiceTag | _ServiceAuthentication | |
| _ServicePricing | _ServicePolicies | |

As a representative example, the output of _ServiceInterfaceMethods of a SOAP service called sagServiceDiscovery is illustrated in the Web Services Description Language (WSDL) Service snippet of Listing 6 (WSDL Service Snippet).

Listing 6:

```
...
<message name="fetchServices">
<part name="arg0" type="xsd:string" />
<part name="arg1" type="xsd:string" />
</message>
<message name="fetchServicesResponse">
<part xmlns:ns1="http://jaxb.dev.java.net/array" name="return"
type="ns1:stringArray" />
</message>
...
<operation name="fetchServices">
<soap:operation soapAction="" />
<input>
<soap:body use="literal" namespace="http://ws.softwareag.net/" />
</input>
<output>
<soap:body use="literal" namespace="http://ws.softwareag.net/" />
</output>
</operation>
...
```

The corresponding call of _ServiceInterfaceMethods(sagServiceDiscovery) will result in the output shown in Listing 7, Service Function Output.

Listing 7:

```
<service name=" sagServiceDiscovery ">
    <method name="fetchServices">
        <input name="arg0" type="xsd:string" />
        <input name="arg1" type="xsd:string" />
        <output name="return" type=" ns1:stringArray " />
    </method>
</service>
```

2. Advanced Functions

Advanced functions are derived from their generic counterparts, allowing deeper insight in intermediary service composability. They build the core modules all around composition matters. This part of the disclosure will focus on an example fundamental minimal set of functions that can be later tuned and extended on demand as required. The example function set is summarized in Table 9, Advanced Composition Functions.

TABLE 9

| Label | Explanation | Addendum |
|---|---|---|
| _IsServiceSyntacticalyComposable | Syntactical check | binary |
| _IsServiceSemanticalyComposable | Semantic check | binary |
| _IsServiceSLACompliant | SLA compliance check | binary |
| _IsServiceLifeCycleCompliant | Life cycle compliance check | binary |
| _IsServiceAuthorityCompliant | Authority compliance check | binary |
| _IsServiceAuthencityCompliant | Authencity compliance check | binary |
| _IsServicePolicyCompliant | Policy compliance check | binary |
| _IsServiceComposable | Composability check | binary |
| _IsServiceSimilar | Similarity check | binary |
| _IsServiceCandidates | Composability check | binary |
| _IsServiceParent | Parental check | binary |
| _IsServiceChild | Childhood check | binary |
| _IsServiceAncestor | Super order check | binary |
| _IsServicePredecessor | Sub order check | binary |
| _IsServiceAdjacents | Composition level check | binary |
| _IsServiceAlternative | Replacement check | binary |

Some functions are decoupled; others have intermediate dependencies, such as the one mentioned above where the semantic composability requires the syntactic counterpart first.

One more case is represented as well through the function _IsServiceComposable, summarizing all the compliance functions beside the semantic check.

These functions can be kept generic, taking dual arguments to generate a Boolean result. They can be extended appropriately to process various kinds of service collections to aggregate the corresponding elementary results to some specific format.

D. Pseudo Code

For the sake of simplicity only two showcase functions are taken in this section, which are representative for the rest of the framework modules. The way they are defined may be thus applicable almost in the same structural manner to all the other methods and procedures.

The code will be shown once in a declarative form à la XQuery and alternatively Java-like in an imperative format, in order to illustrate the broad range of realization capabilities and to keep the framework extension open to different implementations, tools and bench marks.

1. XQuery Pseudo Code of the Generic Function _ServiceComposants

For this example, assume the USDL service snippet from some document CompositeExample.usdl, as shown in Listing 8, Composed Service USDL Snippet.

Listing 8:

```
...
<services xmi:id="Service_14724518" resourceID="http://internet-of-
services.com/usdl/20110228-M5/examples/logistics/services/airline1-international"
version="1.0" nature="Other">
    <names xmi:id="Description_21995759" value="Airfreight Special" type="name"/>
...
    <compositeServices xmi:id="CompositeService_6711891" resourceID="http://internet-of-
services.com/usdl/20110228-M5/examples/logistics/services/carrier1-russia" version="1.0"
nature="Manual" groupingConstraint="3" compositionType="SimplePartsComposite">
    <names xmi:id="Description_30318742" value="Freight Shipment International -
Russia" type="name" language="en"/>
...
        <parts xmi:id="Part_4070693" optional="false" composable="Service_23799679"/>
        <parts xmi:id="Part_17528157" optional="false" composable="Service_14724518"/>
        <parts xmi:id="Part_21383661" optional="true" composable="Service_21620273"/>
        <parts xmi:id="Part_18129862" optional="true" composable="Service_23799679"/>
    </compositeServices>
...
```

The unary function _ServiceComposants can be defined as in Listing 9, Declaration of _ServiceComposants á la XQuery.

Listing 9:

```
declare function local:_ServiceComposants($s as xs:service?)
as xs:string?
{
let $composant :=
doc("CompositeExample.usd")/compositeServices/parts
return (<composant> $composant </composant>)
};
```

The related function call can result in the illustrative output shown in Listing 10, _ServiceComposants Call Output Result.

Listing 10:

```
...
Let $composite = "CompositeService_6711891";
...
... _ServiceComposants($composite) ...
...
<composant>
    Service_23799679
    Service_14724518
    Service_21620273
</composant>
...
```

2. Java Like Pseudo Code of the Advanced Function _IsServiceSyntacticalyComposable Alternatively, the framework functions can be defined in an imperative manner using a corresponding programming language, when it is more appropriate to implement the related algorithms as such this way due to some complexities which address or access further parts using declarative statements or even by virtue of performance consideration.

Moreover, for XQuery there may be diverse application programming interfaces (API's) provided from multiple communities for standard or common programming tools which enable use of the same features under multiple circumstances such as individual preferences or collaborative development platforms. The method _IsServiceSyntacticalyComposable can be defined in a Java-like code as in Listing 11.

Listing 11:

```
Import xml.*;
Import service.*;
Import xquery;
Class ServiceQueryLanguage {
    ...
    Public Boolean _IsServiceSyntacticalyComposable(Service s1,
    Service s2) {
        Boolean value = false;
        For (Method m1 : s1.methods) {
            For (Method m2 : s2.methods) {
                value = m1.output isSubset of m2.output;
                if (true == value) then return value;
            }
        }
        Return value;
    }
}
```

This method can be further extended for a full composability check, for example, where at least every method of the source service is covered from a method of the destination counterpart. In a more elaborated step, for every source method, a list of covering target methods can also be generated.

In summation, there need be no limit to the check permutation and combination possibilities. This can be developed step by step to enhance the verification capabilities and try to cover an adequate range of compounding issues.

V. Implementation Environment

For a concrete implementation of the SOQ paradigm as discussed above and along with the related query framework, an extendable SOA Service Repository full-fledged such as CentraSite may be used, or a repository with at least with a minimal state of governance capabilities and life cycle management, as examples.

A. SOQ Architectural Landscape

A SOA service Repository can be a starting point for the establishment of SOQ. Moreover, a suitable XQuery engine together with related API's for specific extensions may be used to fulfill the communication requirements with the repository. The context of the SOQ realization can be described through the triangular constellation illustrated in the SOQ architectural landscape of FIG. 7.

Figure 7:
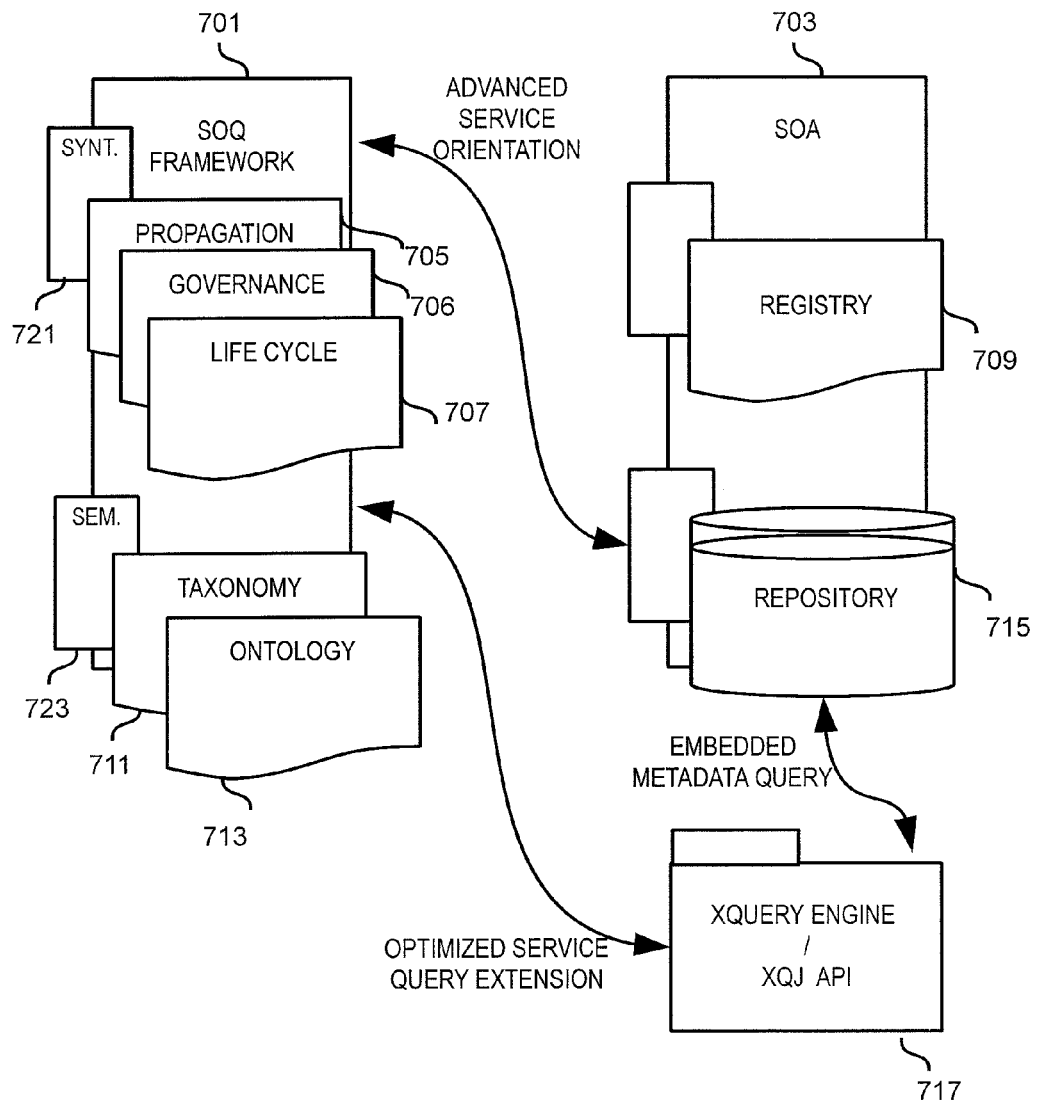
FIG. 7 is an example service oriented query architectural landscape.

FIG. 7 illustrates an SOQ framework 701 which includes, among other things, syntactic aspects 721 of propagation 705, governance 706, lifecycle 707; and semantic aspects 723 of taxonomy 711 and ontology 713. The SOA 703 includes, among other things, a registry 709, and repository 715. An XQuery engine or SQJ API 717 is representative of a query engine, sometimes referred to as a "query facility," that may interchange an embedded metadata query to the repository 715 of the SOA 703 so as to inspect service definitions in the SOA 703; and from the inspected service definitions, can determine attributes of the services, which are used by the query engine to determine whether different services (which have service definitions in the SOA 703) are composable according to rules about syntactic and semantic aspects in accordance with a service-oriented query (SOQ) framework and determined with respect to both syntactic and semantic aspects of the services; and the syntactic and semantic aspects of the services are determined from the attributes obtained from the inspected service definitions of the services. The XQuery engine or SQJ API 717 can interchange an optimized service query extension information with the SOQ framework 701. The SOQ framework 701 and the SOA 703 can interchange advance service orientation information. Syntactic aspects 721 can be generally described as a grammar; additional details are provided elsewhere herein. Semantic aspects 723 can be based on a service description from the service repository, and are more complex than syntactic aspects 721. The taxonomy 711 includes plausible combinations of different service attributes with regard to composability. The ontology 713 includes not only plausible combinations but also, by way of example, indications of when services are to be used, patterns, sets of related services, relations within hierarchies of concepts within a domain, shared vocabularies and/or properties and/or attributes for example within a domain, and variations within ontological concepts as would be understood in information science and ontology building, however, using the service definitions within the service repository. The governance, lifecycle, taxonomy, ontology, registry, repository, and XQuery engine/XQJ/API has all been discussed in detail above, for example, Section III.B and Section IV.

The SOQ framework components as well as the corresponding XQuery extensions are seen as plug-ins that can be adequately integrated within the original SOA repository. In the following sections, representative design showcases of this integration will be presented.

B. SOQ Implementation Design

For the SOQ implementation, only some illustrative components will be shown, such as the global repository layout and the composition wizard as well as the internal structure specification for the static part and an exemplary query process with a representative flow chart for the dynamic counterpart.

1. Generic SOQ Service Repository

A generic SOA repository focusing primarily on service implementing the SOQ specification shown in the above discussion can show, in a first view, a service explorer representing some metadata-like type, for example, the related technical interface in a tabular form containing the implemented methods and a dashboard subsuming some service metrics. This could look like the illustration of FIG. 8, a generic SOQ service repository, which shows information related to a selected service, here, PriceRequestService.

An additional set of buttons may be defined to complete the functional spectrum of services, for example, edit, interface, re/check, update, re/deploy, compose, history, import and/or export. For the sake of simplicity, the integration of the governance component is introduced as representative of the rest of the SOQ features. They can be embedded analogously and almost in the same way as the governance such as shown in the layout from the section just below.

2. SOQ Service Governance

Figure 8:
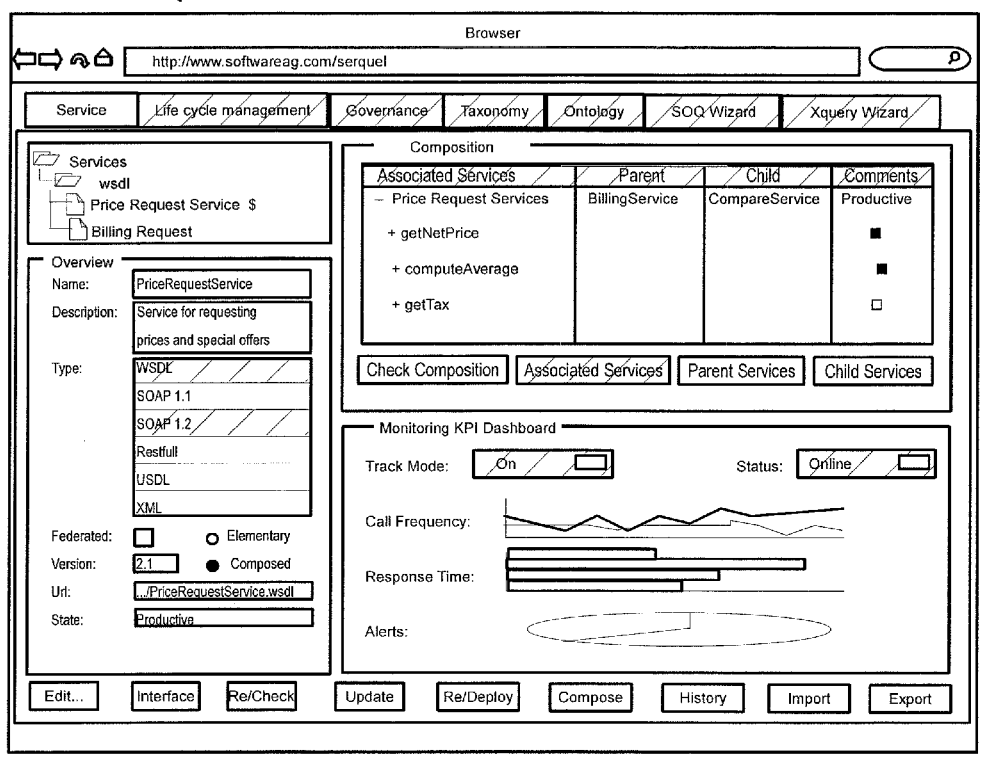
FIG. 8 is a user interface for a service explorer of a service repository.

The illustrated view of FIG. 9, which shows governance of the selected service from FIG. 8, includes the service explorer tree of three management menus for respectively stakeholders, users (covering groups, roles, rights, accesses, notifications, and the like) and security policies, SLA and QoS (covering, e.g., audit logs, performance, availability, security, response time, and faults), for global system maintenance. A set of buttons can provide further governance functionalities, such as edit, profile, re/check, update, re/deploy, contact, history, import and/or export.

3. SOQ XML Item Description

All the components can be instrumented with appropriate XML descriptions. A suitable presentation may resemble that of Listing 12, an XML extract of SOQ Component Description Showcase, describing life cycle, governance and the taxonomy part.

Listing 12:

```xml
<?xml version="1.0" encoding="UTF-8" standalone="no"?>
<soq xmlns="http://www.soq.org/xmlns" xmlns:xsi="http://www.w3.org/2001/XMLSchema-
instance" xmlns:soq="http://www.soq.org/xml/soq/1"
xsi:schemaLocation="http://www.soq.org/xmlns
http://www.soq.org/xml/schema/graphml/1.1/soq.xsd">
    <Service soq:id="9217490732098" soq:name="PriceRequestService"
soq:descriptionId="soqDesc9217490732098" type="SOAP1.1" federated="No"
mode="composed" version="2.1" url="http://www.soq.org/serquel/PriceRequestService.wsdl"
state="productive">
        <lifecycle soq:id="lifecycle13621827638">
            <sourceStage name="test" version="2.7" creation="2014-04-
16T04:39:00.000+0200" modification="2014-04-16T06:30:00.000+0200"/>
            <DestinationStage name="production" version="2.3" creation="2014-04-
17T04:39:00.000+0200" modification="2014-04-17T06:30:00.000+0200"/>
        </lifecycle>
        <governance soq:id="governance907603497">
            <user id="user123454567" name="admin" creation="2014-04-
16T01:00:00.000+0200" modification="" groupId="group012334" roleId="role123344"/>
            <group id="group012334" name="administrators" creation="2014-04-
16T00:40:00.000+0200" modification="" privilegesId="privilege123344"/>
            <role id="role123344" name="provider" creation="2014-04-
16T00:30:00.000+0200" modification="" accessId="access123344"/>
            <stakeholder id="stakeholder123344" name="businessOwner"
creation="2014-04-16T00:30:00.000+0200" participantId="agent12345"/>
        </governance>
```

Listing 12:

```
<taxonomy soq:id="taxonomy65786349568">
    <serviceTaxonomy name="soqServices" version="1.0" creation="2014-
04-16T10:00:00.000+0200" taxonomyId="serviceTaxonomy12344"/>
    <compositionTaxonomy name="soqServices" version="1.0"
creation="2014-04-16T10:00:00.000+0200" taxonomyId="compositionTaxonomy3456">
        <composable symmetric="yes"
serviceTaxinomyId="serviceTaxonomy12344"/>
    </compositionTaxonomy>
    <BusinessTaxonomy name="production" version="2.3" creation="2014-
04-17T04:39:00.000+0200" modification="2014-04-17T06:30:00.000+0200"/>
</taxonomy>
</Service>
</soq>
```

4. SOQ Service Composition Wizard

Figure 10:
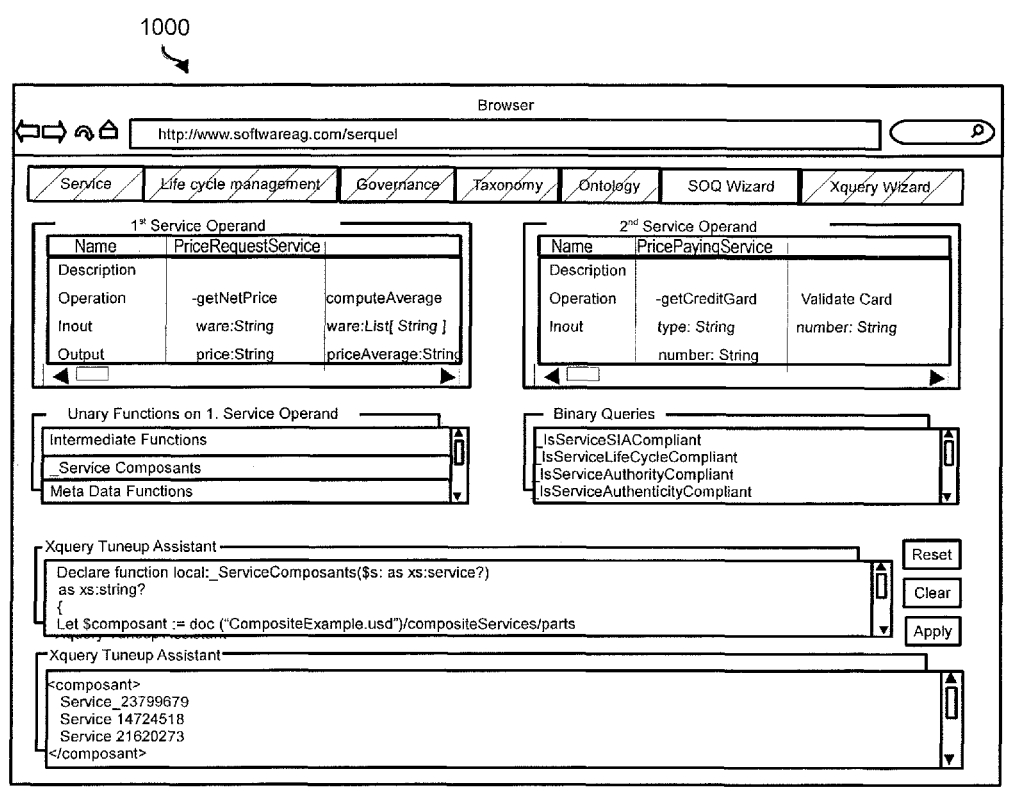
FIG. 10 is a user interface for a SOQ service composition wizard.

A component of such a SOQ enhanced repository may be the composer feature which implements the query framework described above in the previous section. A suitable Integration for unary as well as binary SOQ queries is a layered layout, consisting for example of the following four levels, such as represented in the illustration of FIG. 10, an example SOQ service composition wizard:

Service and sub ordered methods selection level

SOQ functions choice layer

Query modification and tune up level

Result level

The suggested solution in this context is kept open, in this way allowing a dynamic extension and tuning up of the query framework capabilities to meet specific needs and requirements.

5. Introductive Use Case Injection into SOQ Implementation

To come full circle, the introductive use case is projected onto the SOQ mockup, further assuming there are already suitable retail services such as in a retail market place on the web, once enabling price search engines access and to mash up a price report otherwise. Both services have following fictive WSDL specifications respectively:

http://www.marketplace.org/retail/AccessPriceCmpEngine.wsdl http://www.marketplace.org/retail/MashupPrice.wsdl These specifications can be imported automatically within the SOQ repository after being stated as a successful federated corresponding query search result. After being imported, the original definitions can be embedded within corresponding internal SOQ XML specifications that look respectively for both services like Listing 13, SOQ Search Engine Price Access XML Description Snapshot, and Listing 14, SOQ Mashup Price XML Description Snapshot.

Listing 13:

```
<?xml version="1.0" encoding="UTF-8" standalone="no"?>
<soq xmlns="http://www.soq.org/xmlns"
xmlns:xsi="http://www.w3.org/2001/XMLSchema-instance"
xmlns:soq="http://www.soq.org/xml/soq/1" xsi:schemaLocation="http://www.soq.org/xmlns
http://www.soq.org/xml/schema/graphml/1.1/soq.xsd">
    <Service soq:id="9217490732000" soq:name="AccessPriceCmpEngine"
soq:descriptionId="soqDesc9217490732000" type="SOAP1.1" federated="No"
mode="composed" version="2.1"
url="http://www.soq.org/serquel/AccessPriceCmpEngine.wsdl" state="productive">
        <description content="... access price comparing engines ..."/>
        <lifecycle .../>
        <governance .../>
        ...
        <ontology .../>
        <interface ... >
            <xsd:complexType name="priceInfo">
                <xsd:sequence>
                    <xsd:element name="price" type="xsd:double"/>
                    <xsd:element name="currency" type="xsd:string"/>
                    <xsd:element name="region" type="xsd:string"/>
                    <xsd:element name="from" type="xsd:date"/>
                    <xsd:element name="to" type="xsd:date"/>
                </xsd:sequence>
            </xsd:complexType>
            <method name="lookForPrice" ... >
                <input name="produetName" type="String" />
                <input name="searchEngineList" type="xsd:stringArray" />
                <input name="allSearchEnginesFlag" type="xsd:boolean" />
                <output name="priceInfos" type="ns1:list<priceInfo>" />
            </method>
        </interface>
        ...
    </Service>
</soq>
```

Listing 14:

```xml
<?xml version="1.0" encoding="UTF-8" standalone="no"?>
<soq xmlns="http://www.soq.org/xmlns"
xmlns:xsi="http://www.w3.org/2001/XMLSchema-instance"
xmlns:soq="http://www.soq.org/xml/soq/1" xsi:schemaLocation="http://www.soq.org/xmlns
http://www.soq.org/xml/schema/graphml/1.1/soq.xsd">
   <Service soq:id="9217490732010" soq:name="mashupPrice"
soq:descriptionId="soqDesc9217490732010" type="SOAP1.1" federated="No"
mode="composed" version="2.1" url="http://www.soq.org/serquel/mashupPrice.wsdl"
state="productive">
      <description content="... mash up retail product price report ..."/>
      <lifecycle .../>
      <governance .../>
      ...
      <ontology .../>
      <interface ... >
        <xsd:complexType name="priceData">
          <xsd:sequence>
            <xsd:element name="price" type="xsd:double"/>
            <xsd:element name="currency" type="xsd:string"/>
            <xsd:element name="region" type="xsd:string"/>
            <xsd:element name="start" type="xsd:date"/>
          </xsd:sequence>
        </xsd:complexType>
        <method name="computeAverage" ... >
          <input name="priceData" type="ns1:list<priceData>" />
          <output name="averagePrice" type="xsd:double" />
        </method>
      </interface>
      ...
   </Service>
</soq>
```

During the transition into the SOQ internal XML structure, initial best practices default states for all the SOQ components according to specific user criteria and preferences will be applied. Afterwards, additional hints and information about the composability state of both services can be preprocessed in the background, such as will be described later in the following section with an illustrative flowchart.

Thus invoking the technical syntactic compliance query alias _IsServiceSyntacticCompliant, for example, can result in positive feedback which allows the sequential combined call of both services, because the priceData input complex type of the mashup service is a subset of the priceInfo output type of the access service.

The other queries can be covered analogously, where as much result data as possible can be preprocessed almost the same way, such as according to specific priority criteria to avoid a a a redundant or even troublesome overload.

6. SOQ Representative Query Algorithm Flowchart

Figure 11:
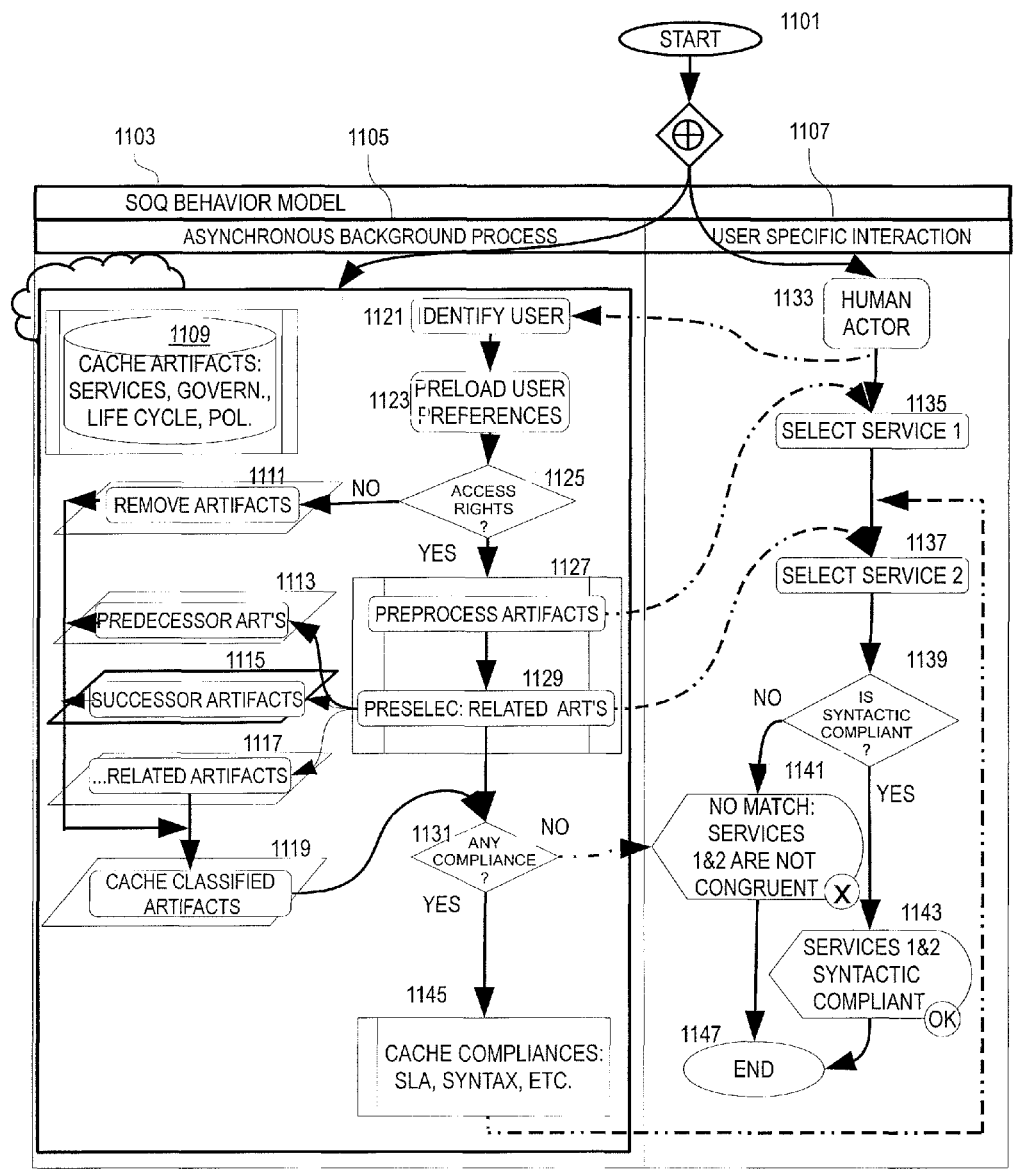
FIG. 11 is a flow chart presenting user specific interactions parallel internal processes invoked within the SOQ engine.

As a concluding showcase, the algorithm used for the binary query _IsServiceSyntacticCompliant from the scenario above will be illustrated in a flow chart presenting the user specific interactions in one side and the parallel internal processes invoked within the SOQ engine in another side such as presented in FIG. 11, an SOQ isSyntacticCompliant Algorithm.

When the system is on and running, services and preliminary inter alia governance and life cycle metadata can be pre-cached. The user identification can trigger internally an additional filter mechanism which can, for example, remove systematically inaccessible artifacts, apply user specific rules and/or preprocess appropriate assets.

After the first service selection, a further optimization step can be invoked through caching many or all related services such as successors, predecessors, neighbors and any related artifacts, removing at the same time incompliant assets. The second service selection can release background compliance checks for SLA, syntax and the like. The SOQ query function selection can access just the cached result for output and display.

The rest of the queries can be invoked and processed analogous to the one shown above, where a suitable filter mechanism and adequate optimization steps can take place in the background to enhance the global system performance as well as data integrity and consistency.

More particularly, in FIG. 11, after a start 1101, a query is processed by the SOQ behavior model 1103 as an asynchronous background process 1105 or a user specific interaction 1107. A user specific interaction 1107 can interact with a human actor 1133 to select service 1 1135 and service 2 1137. It is determined whether the services are syntactic compliant 1139. If it is syntactic compliant, then services 1 and 2 are determined as syntactic compliant 1143 and the process ends 1147. If it is not syntactic compliant, then services 1 and 2 are determined as no match 1141—services are not congruent and the process ends 1147.

An asynchronous background process 1105 can identify the user 1121 (for example using known techniques such as by receiving input from the human actor 1133), preload user preferences 1123, and then determine whether the user has access rights 1125. If the user does not have access rights, then the artifacts are removed 1111. If the user has access rights, then the artifacts are preprocessed 1127 (and optionally the preprocessed information is provided to the user specific interaction 1107 as data about service 1 153) and related artifacts are preselected 1129 (and optionally the preselected related artifacts are provided to the user specific interaction 1107 as candidate selections for service 2 1137); then the asynchronous background process 1105 can then determine the predecessor artifacts 1113, successor artifacts 1115, and related artifacts 1117. These are the classified artifacts. The classified artifacts are cached 1119. Then, the asynchronous background process 1105 determines whether there is any compliance 1131. If there is no compliance 1131, then the asynchronous background process 1105 indicates to the user specific interaction 1107 that there is no match 1141, services are not congruent, and the process ends 1147. If there is any compliance 1131, then the asynchronous background process 1105 can cache 1145 all of those items which are determined to be compliant such as SLA, syntax, and the like. Then, the user specific interaction 1107 can interact with the user to determine another service, and continue processing.

VI. Additional Embodiments

Figure 25:
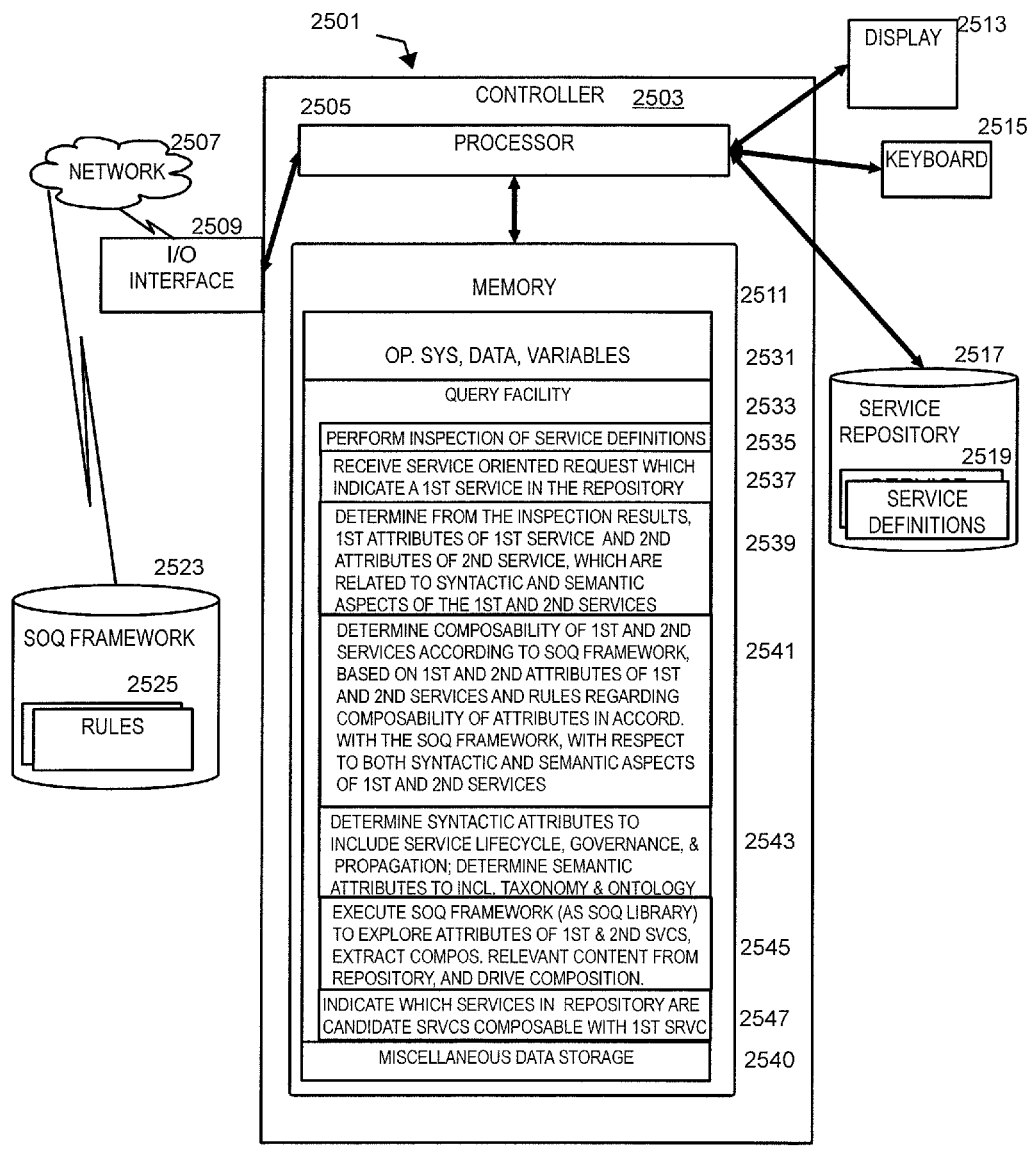
FIG. 25 is a block diagram illustrating relevant portions of a computer system.

Based on the above discussion, additional embodiments can be constructed. For example, referring now to FIG. 25, a block diagram illustrating relevant portions of a computer system 2501, and variations thereof, will be discussed as another concrete example embodiment. FIG. 25 provides an example implementation of the service oriented query architectural landscape of FIG. 7 which was discussed in detail above.

The computer system 2501 may include one or more controllers 2503, a processor 2505, an input/output (i/o) interface 2509 for communication such as with a computer network or data network 2507 (e.g., a cloud, an intranet, the internet, and the like), a memory 2511, a display 2513, and/or a user input device represented here by a keyboard 2515. Alternatively, or in addition to the keyboard 2515, a user input device may comprise one or more of various known input devices, such as a keypad or a pointing device such as a computer mouse, a touchpad, a touch screen, joy stick, a trackball, or the like. The display 2513 may present information to the user by way of a conventional liquid crystal display (LCD) or other visual display, and/or by way of a conventional audible device (e.g., a speaker) for playing out audible messages. Portions of the computer system 2501 are well understood to those of skill in this area and have been omitted to avoid obscuring the discussion.

The processor 2505 may comprise one or more microprocessors and/or one or more digital signal processors. The memory 2511 may be coupled to the processor 2505 and may comprise a read-only memory (ROM), a random-access memory (RAM), a programmable ROM (PROM), and/or an electrically erasable read-only memory (EEPROM). The memory 2511 may include multiple memory locations for storing, among other things, an operating system, data and variables 2531 for programs executed by the processor 2505; computer programs for causing the processor to operate in connection with various functions such as a query facility 2533; the query facility can include a function to perform 2535 inspection of service definitions; receive 2537 a service oriented request; determine 2539, from the inspection results, attributes of the services; to determine 2541 composability of first and second services according to a service query framework (also referred to herein as a service-oriented query framework, and SOQ framework) 2523 with respect to both syntactic and semantic aspects of the first and second services; to determine 2543 syntactic attributes and semantic attributes; to execute 2545 the SOQ framework 2523 as an SOQ library to explore attributes of the first and second services, extract composition relevant content from the repository 2517, and to drive composition; to indicate 2547 which services in the repository are candidate services composable with the first service; and to include other memory such as for miscellaneous storage 2540. The computer programs may be stored, for example, in ROM or PROM and may direct the processor 2505 in controlling the operation of the computer 2501. Each of these functions is considered in more detail herein, to the extent that it is not detailed elsewhere in this document.

In the example of FIG. 25, the service repository 2517 is stored according to conventional techniques using known structures in an electronic storage and can include, for each service, the definitions of the service 2519. The service repository 2517 may be local as illustrated or remote, such as in a cloud. Also, a computer system 2501 can access a SOQ framework 2523 which stores rules 2525 discussed further herein. The framework of FIG. 6 may conveniently be implemented in connection with the SOQ framework 2523.

The processor 2525 may cause user interfaces such as those illustrated in FIG. 8 to FIG. 10 to be provided on the display 2513, so as to direction operation of a query facility 2533. The user may invoke functions accessible through the user input device represented here by the keyboard 2515; the keyboard 2515 may be supplemented or replaced with a scanner, card reader, or other data input device. Responsive to manual signaling from the user input device represented by the keyboard 2515, in accordance with instructions stored in memory 2511, and/or automatically upon receipt of certain information via the i/o interface 2509, the processor 2505 may direct the execution of the stored programs.

The processor 2505 may be programmed with a query facility 2533, which can refer to extended functionality of, for example, a standard query facility. The query facility can include various service-composability functionality, e.g., one or more of functions 2535 to 2547.

The processor 2505 may be programmed to perform 2535 inspection of service definitions, which are stored in the service repository 2517. Service definitions in service repositories are known and can be inspected according to conventional techniques.

The processor 2505 may be programmed to receive 2537 a service oriented request which can indicate a service in one or more of the service repositories 2517. Various example service oriented requests which implicate a need to determine composability of services are discussed herein. The request may be received according to known techniques.

The processor 2505 may be programmed to determine 2539, from the inspection results, first attributes of the first service and second attributes of the second service, which are related to syntactic and semantic aspects of the first and second services.

The processor 2505 may be programmed to determine 2541 composability of the first and second services according to the SOQ framework 2523, based on the first and second attributes of the first and second services and rules 2525 regarding composability of attributes in accordance with the SOQ framework 2523, with respect to both syntactic and semantic aspects of the first and second services.

The processor 2505 may be programmed to determine 2543 syntactic attributes to include service lifecycle, governance, and propagation; and to determine semantic attributes to include taxonomy and ontology. In an embodiment, composability with regard to syntax of the services can be determined before determining composability with regard to semantics of the services. If the syntactic attributes of the services are not composable, then there may be no reason to proceed with determining composability with regard to the semantic aspects because the services are not composable when the syntactic attributes are not composable.

The processor 2505 may be programmed to execute 2545 the SOQ framework 2523, which may be implemented as an SOQ library, to explore attributes of the first and second services, to extract composition relevant content from the repository 2517, and to drive composition.

The processor 2505 may be programmed to indicate 2547 which services in the repository 2517 are candidate services composable with the first service.

The service repository 2517, here one is representative of one or more service repositories, can be a pre-existing data structure which stores services and service definitions 2519 according to known techniques. The service definitions 2519 can be obtained from the service repository 2517 using known techniques. A wide variety of service definitions can be provided, and furthermore, the service definitions for one service may (or may not) be directly translatable for use with another service. Note that other services may be stored in the same service repository 2517, or within a different service repository (not illustrated).

The processor 2505 may be programmed to classify 2539 attributes of the services based on the SOQ library 2523, to include service lifecycle, governance, propagation, taxonomy, and ontology. In combination, these can indicate a best fit result for the service oriented request.

The processor 2505 may be programmed to indicate 2541 which of the services in the repository are candidate services determined to be composable with the first service. This is discussed in more detail herein.

As will be understood in this field, besides the functions discussed above, the memory 2511 can include locations for other miscellaneous data along with the usual temporary storage and other instructions for other programs not considered herein. For example, information retrieved from the services repository 2517 might be stored locally into the miscellaneous data 2540.

The computer system 2501 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 2505, memory 2511, a disk drive and/or removable storage medium are referred to as "computer-readable storage media" and provide non-transitory storage of computer programs and data.

It should be understood that FIG. 25 is described in connection with logical groupings of functions or resources. One or more of these logical groupings may be performed by different components from one or more embodiments. For example, the ability to actually execute services 2541 stored in the service repository 2517 may be omitted. As another example, the functionality associated with indicating 2547 which services in the repository are candidate services can be omitted from the computer system 2501. As a further example, the display 2513 and/or keyboard 2515 can be omitted from a computer system 2501 which is performing an automated determination without human interaction. Similarly, the I/O interface 2509 can be omitted. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

The procedure illustrated in FIG. 11 may be implemented on the computer system of FIG. 25 or other apparatus appropriately configured.

In summary, querying services for composition purposes is a challenge not only due to the multiple heterogeneous definition forms but also the related description formats already available. The whole infrastructure built all around services is to be taken into account in order to ensure a robust and correct as well as ambiguity free service combination, consistent with the way it is described and presented in this document.

VII. Glossary

The claims may use the following terms, which are defined to have the following meanings for the purpose of the claims herein. Other definitions may be specified in this document. The following may also be helpful for interpreting the discussion herein.

The phrase "automatically without manual intervention" in a claim is defined to mean that the particular step occurs after the step is initiated until limitations recited in the step are finished without requiring a user to provide input to a processor.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The above discussion may use the designation "SOA: or "Service-Oriented Architecture," which refers to a software design and software architecture design pattern based on discrete pieces of software providing application functionality as services to other applications.

The designation "SOAP" or "Simple Object Access Protocol" may be used above and refers to a commonly known protocol specification for exchanging structured information in the implementation of web services in computer networks; it relies on the XML Information Set (described in a W3C specification which describes an abstract data model in terms of a set of information items) for its message format as well as on other application layer protocols such as notably HyperText Transfer Protocol (HTTP) or Simple Mail Transfer Protocol (SMTP), for message negotiation and transmission.

The above discussion may use the designation "SOC" or "Service-Oriented Computing," which refers to various techniques and concepts for the creation of modular software solutions based on services based on SOA providing solution and solution platforms such as those which are commonly known as cloud computing, in which computing is delivered as a service rather than a product and shared resources are provided over a network, and utility computing, which is a service provisioning model.

The above discussion may refer to "SOE" or "Service-Oriented Engineering," also sometimes designated as "Service-Oriented Software Engineering" (SOSE), which is a methodology focused on the development of software systems by composition of reusable services, sharing many characteristics of component-based software engineering and the composition of software systems from reusable components, adding the ability to dynamically locate services at runtime.

The term "SQL" or "Structured Query Language" refers to a special purpose programming language commonly known in the art designed for managing data stored in a relational database management system.

The above discussion may refer to Unified Service Description Language (USDL) as a convenient example which is representative of a formal service description language. USDL is a formal language known in the information sciences to describe services in respect to the access of services. Current key players of the development of USDL are SAP and Telecom. USDL allows a unified description of business, operational and technical aspects of services as depicted in the figure. Technical services may be lifted to business services, but USDL also allows describing more manual or physical services. As many services have a hybrid character with both a digital and physical or manual footprint, USDL can facilitate the combination and aggregation of such services. USDL can be implemented in accordance with standards including USDL 3.0 M5, USDL 3.0 M4, USDL XG, and variations and evolutions thereof. For the reader's convenience, the following brief description of USDL is provided from the Internet of Services organization: "The Unified Service Description Language (USDL), creates a 'commercial envelope' around a service. More specifically, USDL allows a unified description of business, operational and technical aspects of services as depicted in the figure. As many services have a hybrid character with both, a digital and physical or manual footprint, USDL can facilitate the combination and aggregation of such services. Therefore, USDL can be considered one of the foundational technologies to set up an Internet of Services around today's core enterprise systems."

Another formal service description language is Web Services Description Language (WSDL) which is an XML-based language that is used for describing the functionality offered by a Web service. A WSDL description of a web service (also referred to as a WSDL file) provides a machine-readable description of how the service can be called, what parameters it expects, and what data structures it returns. It thus serves a roughly similar purpose as a method signature in a programming language. WSDL can be implemented in accordance with standards including WSDL 2.0, and variations and evolutions thereof.

Another formal service description language is Web Application Description Language (WADL), which is a machine-readable XML description of HTTP-based web applications (typically REST web services). WADL models the resources provided by a service and the relationships between them. WADL is intended to simplify the reuse of web services that are based on the existing HTTP architecture of the Web. It is platform and language independent and aims to promote reuse of applications beyond the basic use in a web browser.

The term "XML" or "Extensible Markup Language" refers to a commonly known, free open standard markup language that defines a set of rules for encoding documents in a format that is both human-readable and machine-readable.

Moreover, the discussion herein refers to a "service" or "services"; a service is regarded as a transaction, generally commercial in nature, between two different parties, where one party to the transaction has resources and grants temporary access, to those resources, to the other party to whom the service is offered, in order to perform a prescribed function and provide, to the other party, a related benefit. Examples of resources include, by way of illustration and not limitation, one or more of human workforce and skills, technical systems, information, consumables, land, and/or others. Examples of services, by way of illustration and not limitation, include: a taxi service (resources are the driver, the car, the maps, the billing system, and the call center; the function and related benefit are the transportation from one point to another); a rating service which defines creditworthiness of a company (main resources are information systems and their content, there is a price scheme (flat rate or per-use), function is to receive a rating, benefit is to reduce transaction risk). Other examples of services, by way of illustration and not limitation, include event management, transportation, insurance, medical services—there are many other examples.

The designation "service composition" is used to refer to a structure which is a collection of interdependent services and which is a composition of individual services, in which each of the services in the service composition is represented as its own separate structure and is not absorbed into an aggregate summary of the services; a service composition may be part of another (parent) service composition.

VIII. Misc. Implementation Notes and Technical Notes

This section provides some implementation and/or technical notes which discuss some basic technical information which will be understand and which are relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order, i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments that demonstrate a method and/or system for a service matching framework for SOA have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The system used in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof as issued. The foregoing description is not intended to be exhaustive or to limit the invention to the precise form disclosed, but is offered to enhance an understanding and appreciation for the inventive principles and advantages thereof. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system for use with at least one service repository, in which the at least one service repository stores service definitions for a plurality of services, the computer system comprising:

a processor, the processor is configured with:

a query facility, the query facility is configured to
obtain service definitions for each of a first service and a second service, wherein the service definitions are obtained from at least one service repository;

extract, from the service definitions which were obtained from the at least one service repository, (i) first attributes associated with the first service and (ii) different second attributes associated with the second service, the first and second attributes being syntactic aspects of the first and second services and semantic aspects of the first and second services; and responsive to a service oriented request which indicates the first service in the at least one service repository, determine a composability of the first and second services into a service composition in accordance with a service oriented query (SOQ) framework, based on (i) the first and second attributes associated with the first and second services, which were extracted from the service definitions and (ii) rules in the SOQ framework regarding composability of attributes, the composability of the first and second services into the service composition being determined with respect to both the syntactic aspects of the first and second services and the semantic aspects of the first and second services, and provide a response to the service oriented request that indicates which services in the repository are candidate services that are determined to have composability with the first service,
wherein a service composition is a collection of interdependent services and which is a composition of individual services, each of the services in the service composition is represented as its own separated structure which is separate from other services in the service composition.

2. The computer system of claim 1, wherein
the syntactic aspects used by the processor to determine the composability comprise lifecycle, governance and propagation attributes; and
the semantic aspects used by the processor to determine the composability comprise taxonomy and ontology attributes.

3. The computer system of claim 1, wherein the SOQ framework is implemented as an SOQ library, which when executed by the processor causes the processor to be configured: to explore the attributes of the first and second services, to extract composition-relevant content from the at least one repository, and to drive a composition process using the composition-relevant content as the syntactic aspects and the semantic aspects through syntactic and semantic steps to determine the composability of the first and second services.

4. The computer system of claim 1, wherein the query facility is an XQuery facility, XQuery facility being extended by functionality of an SOQ library.

5. The computer system of claim 1, wherein the processor is configured to
determine the composability with respect to the syntactic aspects of the first and second services before the composability with respect to the semantic aspects of the first and second services is determined,
determine the composability with respect to the semantic aspects when the syntactic aspects of the first and second services are determined to be composable, and
skip a determination of the composability with respect to semantic aspects when the syntactic aspects of the first and second services are determined to not be composable, and indicate that there is no composability of the first and second services.

6. The computer system of claim 1, wherein the processor is further configured to classify the attributes of the first and second services based on the SOQ framework to include service lifecycle, governance, propagation, taxonomy, and ontology, which in combination indicate a best fit result for the service oriented request.

7. The computer system of claim 1, wherein the services in the service composition include a primary service coupled with a downstream service.

8. A method to perform matching of services for composition, for use with at least one service repository in which the at least one service repository stores service definitions for a plurality of services, the method comprising:
obtaining, by a query facility of a processor, service definitions for each of a first service and a second service, wherein the service definitions are obtained from at least one service repository;
extracting, by the query facility of the processor, from the service definitions which were obtained from the at least one service repository, (i) first attributes associated with the first service and (ii) different second attributes associated with the second service, the first and second attributes being syntactic aspects of the first and second services and semantic aspects of the first and second services; and
by the query facility of the processor, responsive to a service oriented request which indicates the first service in the at least one service repository,
determining a composability of the first and second services into a service composition in accordance with a service oriented query (SOQ) framework, based on (i) the first and second attributes associated with the first and second services, which were extracted from the service definitions and (ii) rules in the SOQ framework regarding composability of attributes, the composability of the first and second services into the service composition being determined with respect to both the syntactic aspects of the first and second services and the semantic aspects of the first and second services, and
providing a response to the services oriented request that indicates which services in the repository are candidate services that are determined to have compositility with the first service,
wherein a service composition is a collection of interdependent services and which is a composition of individual services, each of the services in the services composition is represented as its own separate structure which is separate from other services in the services composition.

9. The method of claim 8, wherein
the syntactic aspects used by the processor to determine the composability comprise lifecycle, governance and propagation attributes; and
the semantic aspects used by the processor to determine the composability comprise taxonomy and ontology attributes.

10. The method of claim 8, wherein the SOQ framework is implemented as an SOQ library, further comprising executing the SOQ library, by the processor, causing the processor: to explore the attributes of the first and second services, to extract composition-relevant content from the at least one repository, and to drive a composition process using the composition-relevant content as the syntactic aspects and the semantic aspects through syntactic and semantic steps to determine the composability of the first and second services.

11. The method of claim 8, wherein the query facility is an XQuery facility, XQuery facility being extended by functionality of an SOQ library.

12. The method of claim 8, further comprising
determining, by the processor, the composability with respect to the syntactic aspects of the first and second services before the composability with respect to the semantic aspects of the first and second services is determined,
determining, by the processor, the composability with respect to the semantic aspects when the syntactic aspects of the first and second services are determined to be composable, and
skipping, by the processor, a determination of the composability with respect to semantic aspects when the syntactic aspects of the first and second services are determined to not be composable, and indicating that there is no composability of the first and second services.

13. The method of claim 8, further comprising classifying, by the processor, the attributes of the first and second services based on the SOQ framework to include service lifecycle, governance, propagation, taxonomy, and ontology, which in combination indicate a best fit result for the service oriented request.

14. The method of claim 8, wherein the services in the service composition include a primary service coupled with a downstream service.

15. A non-transitory computer readable medium comprising executable instructions for a method to perform matching of services for composition, for use with at least one service repository in which the at least one service repository stores service definitions for a plurality of services, the instructions for implementing:
  obtaininq, in a query facility, service definitions for each of a first service a second service, wherein the service definitions are obtained from at least one service repository;
  extracting, by the query facility, from the service definitions which were obtained from the at least one service repository, (i)first attributes associated with the first service and (ii) different second attributes associated with the second service, the first and second attributes being syntactic aspects of the first and second services and semantic aspects of the first and second services; and
  by the query facility, responsive to a service oriented request which indicates the first service in the at least one service repository,
    determining a composability of the first and second services into a service composition in accordance with a service oriented query (SOQ) framework, based on (i)the first and second attributes associated with the first and second services, which were extracted from the service definitions and (ii) rules in the SOQ framework regarding composability of attributes, the composability of the first and second services being determined with respect to both the syntactic aspects of the first and second services and the semantic aspects of the first and second services, and
    providing a response to the service oriented request that indicates which services in the repository are candidate services that are determined to have composability with the first service,
  wherein a service composition is a collection of interdependent services and which is a composition of individual services,each of the services in the service composition is respresented as its own separated structure which is separate from other services in the service composition.

16. The non-transitory computer readable medium of claim 15, wherein
  the syntactic aspects used to determine the composability comprise lifecycle, governance and propagation attributes; and
  the semantic aspects used to determine the composability comprise taxonomy and ontology attributes.

17. The non-transitory computer readable medium of claim 15, wherein the SOQ framework is implemented as an SOQ library, further comprising executing the SOQ library to implement: exploring the attributes of the first and second services, extracting composition-relevant content from the at least one repository, and driving a composition process using the composition-relevant content as the syntactic aspects and the semantic aspects through syntactic and semantic steps to determine the composability of the first and second services.

18. The non-transitory computer readable medium of claim 15, wherein the query facility is an XQuery facility, XQuery facility being extended by functionality of an SOQ library.

19. The non-transitory computer readable medium of claim 15, further comprising
  determining the composability with respect to the syntactic aspects of the first and second services before the composability with respect to the semantic aspects of the first and second services is determined,
  determining the composability with respect to the semantic aspects when the syntactic aspects of the first and second services are determined to be composable, and
  skipping a determination of the composability with respect to semantic aspects when the syntactic aspects of the first and second services are determined to not be composable, and indicating that there is no composability of the first and second services.

20. The non-transitory computer readable medium of claim 15, further comprising classifying the attributes of the first and second services based on the SOQ framework to include service lifecycle, governance, propagation, taxonomy, and ontology, which in combination indicate a best fit result for the service oriented request.

21. The non-transitory computer readable medium of claim 15, wherein the services in the service composition include a primary service coupled with a downstream service.

* * * * *